US011196833B1

(12) United States Patent
Norbutas

(10) Patent No.: US 11,196,833 B1
(45) Date of Patent: Dec. 7, 2021

(54) PROXY SERVER SYNCHRONIZER

(71) Applicant: Teso LT, UAB, Vilnius (LT)

(72) Inventor: Emanuelis Norbutas, Vilnius (LT)

(73) Assignee: Teso LT, UAB, Vilnius (LT)

( * ) Notice: Subject to any disclaimer, the term of this patent is extended or adjusted under 35 U.S.C. 154(b) by 0 days.

(21) Appl. No.: 17/136,890

(22) Filed: Dec. 29, 2020

(51) Int. Cl.
H04L 29/08 (2006.01)

(52) U.S. Cl.
CPC .............. *H04L 67/28* (2013.01); *H04L 67/02* (2013.01); *H04L 67/1095* (2013.01)

(58) Field of Classification Search
CPC ...... H04L 67/02; H04L 67/1095; H04L 67/28
See application file for complete search history.

(56) References Cited

U.S. PATENT DOCUMENTS

| 2004/0030775 A1* | 2/2004 | Lauzon | H04L 67/303 709/224 |
| 2016/0330269 A1* | 11/2016 | Alstad | H04L 67/42 |
| 2020/0220746 A1* | 7/2020 | Shribman | G06F 9/45545 |

* cited by examiner

*Primary Examiner* — Gil H. Lee
(74) *Attorney, Agent, or Firm* — FisherBroyles. LLP

(57) ABSTRACT

Systems and methods of web crawling/scraping process implementation are extended and target the web crawling process by submitting a request by a last-mile proxy to a web target. The systems and methods allow a request for a web crawler to be directed toward the target content platform through a proxy, or a plurality of proxies, for the purpose of optimizing the processing of the request. In at least one aspect, the systems and methods disclosed mitigate the potential for a negative evaluation of the requests by the content platform targeted through introducing the transfer of the execution of the steps within a scraping flow within the last-mile proxy system, thus aligning both network and application layer responses to the tests described.

23 Claims, 21 Drawing Sheets

PROXY SERVER SYNCHRONIZER

FIELD

In one aspect, the embodiments detailed herewithin relate to methods of optimizing the operational process of web crawling or web scraping by advanced proxying and fully or partially migrating scraping functionality to the last-mile proxy.

BACKGROUND

Data gathering from the web is an important and often vital task for many business domains. The importance and value of data are ever-increasing and therefore the need for more efficient tools of data retrieval and analysis is growing. The two main tools for accessing data sources on the web are web crawling and web scraping.

The general purpose of web crawling is to access publicly available web resources (usually web pages), retrieve their content, and forward the content to the user. The basic purpose of web scraping is to analyze the data retrieved by the web crawler and extract information requested by the user.

A web crawler (also known as a web spider, bot) is a program or automated script which navigates the web in a methodical, automated manner. Its primary task is to gather the information ordered by the user. The web crawler does so by browsing the web for the requested info and retrieving raw Hypertext Markup Language (HTML) code of the accessed web sites. Another purpose of utilizing web crawling is the indexing of web content by search engines.

Web scraping (also known as web harvesting, web data extraction) is a process of fetching the accessed web pages and parsing the content for the requested data. Web scraping can be done manually, but typically comprises of automated processes implemented using a web crawler.

Web crawling and web scraping tools are often used together as the scraping functionality heavily depends on web crawling results. More specifically, web crawling is the main component of web scraping. Data accessed and fetched by a web crawler is then processed by a web scraper which analyses the fetched content and extracts the required data.

The operation of a web crawler undergoes a sequence of tasks including taking in the request, gathering data, and delivering data. More specifically, the tasks of a web crawler include: accepting the request from the user; managing the request queue; balancing the load between processing services; attempting to retrieve the requested data; data storage; and data delivery. The task of attempting data retrieval further includes managing Hypertext Transfer Protocol (HTTP) and Hypertext Transfer Protocol Secure (HTTPS) requests, rotating proxies, and headers.

A web crawler uses a standard HTTP/HTTPS request/response model to call and access targets. This model describes the client-server communication via the web. A client sends an HTTP request to the server asking for access to specific data. A server sends an HTTP response back to the client with the requested data. The HTTP request indicates the target Uniform Resource Locator (URL), the access method, and the headers. The HTTP response returns status information, the headers, and the requested data.

Web scraping (also known as screen scraping, data mining, web harvesting) in its most general sense is the automated gathering of data from the internet. More technically, it is the practice of gathering data from the internet through any means other than a human using a web browser or a program interacting with an application programming interface (API). Web scraping is usually accomplished by writing a program that queries a web server and requests data automatically, then parses the data to extract the requested information.

Web scrapers—programs written for web scraping—can have a significant advantage over other means of accessing information, like web browsers. The latter are designed to present the information in a readable way for humans, whereas web scrapers are excellent at collecting and processing large amounts of data quickly. Rather than opening one page at a time through a monitor (as web browsers do), web scrapers are able to view large databases consisting of thousands or even millions of pages at once.

Sometimes the website allows another automated way to transfer its structured data from one program to another via an API. Typically, a program will make a request to an API via HTTP for some type of data, and the API will return this data from the website in the structured form. It serves as a medium to transfer the data. However, using APIs is not considered web scraping since the API is offered by the website (or a third party) and it removes the need for web scrapers.

An API can transfer well-formatted data from one program to another and the process of using it is easier than building a web scraper (a bot) to get the same data. However, APIs are not always available for the needed data. Also, APIs often use volume and rate restrictions and limit the types and the format of the data. Thus, a user would use web scraping for the data for which an API does not exist or which is restricted in any way by the API.

Usually, web scraping includes the following steps: retrieving Hypertext Markup Language (HTML) data from a website; parsing the data for target information; saving target information; repeating the process if needed on another page. A program that is designed to do all of these steps is called a web scraper. A related program—a web crawler (also known as a web spider)—is a program or an automated script that performs the first task, i.e. it navigates the web in an automated manner to retrieve raw HTML data of the accessed web sites (the process also known as indexing).

There are techniques that websites use to stop or slow down a bot since scraping may overload the website. For example, they may try to identify the IP address of the bot and block it to prevent further access by the bot. To do that, the website needs to identify the bot-like behavior of the web scraper and to identify its IP address.

Recognizing the bot-like behavior can be done in multiple ways. One involves a limit on the rate of actions (or actions over time) since humans normally perform actions slower than a bot would. To circumvent this, web scrapers often choose to employ proxies that mask the real IP address of the web scraper and perform web scraping through multiple proxy IP addresses at the same time to both keep up the gathering speed and avoid being blocked. In return, web servers are trying to detect and mitigate proxy scraping over HTTP.

Scraping activity may be performed/executed by multiple types of application agents: browser and headless browser. In technical terms, a headless browser refers to a web browser without a graphical user interface. Headless browsers provide automated control of a web page in an environment similar to normal web browsers but are executed via a command-line interface or using network communication.

There are two significant types of web scraping: manual scraping and automated scrapping. Manual web scraping involves copying and pasting web content, which requires more human effort and is highly repetitive in the way it is carried out. However, manual scraping is rarely executed in practice, due to the fact that automated scraping is far quicker and cheaper to implement. HTML parsing, DOM (Document Object Model) parsing, vertical aggregation, XPath, Type pattern matching are some of the exemplary types of automated web scraping.

The DOM parsing method defines the style, structure and content within XML files. DOM parsers are generally used by scrapers that aim to get an in-depth view of the structure of a web page. Scrapers can use a DOM parser to get the nodes containing information, and then use a tool such as XPath to scrape web pages. Full-fledged web browsers can be embedded to extract the entire web page or just parts of it, even if the content generated is dynamic in nature.

The Vertical aggregation web scraping involves creating scraping platforms with access to large-scale computing power to target specific data. Some web scraping companies run these scraping platforms on the cloud. Creation and monitoring of bots for specific verticals is carried out by these platforms with virtually no human intervention. Since the bots are created automatically based on the knowledge base for the specific data, their efficiency is measured by the quality of data extracted.

XPath is a query language that works on XML documents. Since XML documents are based on a tree-like structure, XPath can be used to navigate across the tree by selecting nodes based on a variety of parameters. XPath can be used in conjunction with DOM parsing to extract an entire web page and publish it at the destination website.

Lastly, the type pattern matching method is a regular expression-matching technique using the UNIX grep command and is usually implemented with programming languages like Perl or Python. There are several web scraping tools and services available, such as cURL, Wget, HTTrack, Import.io, Node.js, and several others that are highly automated. Automated web scraping can be implemented either through a dedicated third-party web scraping software or through a custom written script. Web Scraping software falls under two categories. The first category of software can be locally installed within a user's computer or a server. The second category of software can be run in a cloud—browser base. Web scraping by writing a script for custom data extraction software is usually implemented to suit a specific requirement. (For a highly tailored data extraction functionality there might be a customized coded solution developed).

HTTP messages are sent across the internet unencrypted and therefore are readable by any party that sees the message as it is routed to its destination. The internet provides no control over how messages are routed. Because HTTP is plain-text, messages can be intercepted, read, and even altered on the go.

HTTPS is the secure version of HTTP that encrypts messages in transit by using the Transport Layer Security (TLS) protocol, also known as Secure Sockets Layer (SSL).

HTTPS works by using asymmetric encryption, which entails servers providing public keys in the form of digital certificates when users first connect. The browser encrypts messages by using this public key, which only the server can decrypt, as only it has the corresponding private key. This system allows a user to communicate securely with a website without having to know a shared secret key in advance.

The digital certificates are issued, and digitally signed, by various certificate authorities (CAs) trusted by the browser, which is why it is possible to authenticate that the public key is for the server connected to. HTTPS connections go through a protocol-negotiation stage to set up the connection, as they need to agree on the SSL/TLS protocol, cipher, and various other settings to use before the connection is established and HTTP messages are exchanged. This stage is flexible, allowing new HTTPS protocols and ciphers to be introduced and used only when both user and server agree to use them.

Using HTTPS means using SSL/TLS to encrypt a standard HTTP connection. Public-private key encryption is known as asymmetric encryption because it uses different keys to encrypt and decrypt messages. This type of encryption is needed to allow secure communication to a server never connected to before. This agreement happens during the TLS handshake, which occurs at the beginning of the connection.

In addition to being used to agree on the symmetric encryption key to be used, public-private key cryptography is used to confirm identity. Identity is confirmed as messages are signed by the server's hidden private key, which can be unlocked with the public key in the certificate. Each SSL/TLS certificate is also cryptographically signed by a recognized certificate authority that the computer trusts. If user certificates are being used, a similar process works in reverse. With regard to identity, all that can be confirmed is that the server domain is part of the signed SSL/TLS certificate.

Web applications employ the TLS protocol to secure HTTP communication (i.e., HTTP over TLS, or HTTPS) between a user's browser and the web server. TLS enables users to securely access and interact with their online accounts, and protects, among other things, common user authentication credentials, such as passwords and cookies. Such credentials are considered weak; they are transmitted over the network and are vulnerable unless protected by TLS. However, if an intermediary successfully impersonates the server to the user, it can transparently intercept HTTPS traffic. This method is known as TLS Man-In-The-Middle (MITM). TLS server authentication is commonly achieved through the use of server certificates. A server certificate binds a public key to the identity of a server, designating that this server holds the corresponding private key. The browser accepts a certificate if it bears the signature of any trusted Certificate Authority (CA). Browsers are typically configured to trust hundreds of CAs. An intermediary can thus successfully impersonate a legitimate server to the browser by presenting a valid certificate for that server, as long as it holds the corresponding private key.

HTTPS is hosted on a different port by default (port 443 as opposed to port 80 for standard HTTP), and it has a different URL scheme (https:// as opposed to http:// for standard HTTP), but it does not fundamentally alter the way HTTP is used in terms of syntax or message format except for the encryption and decryption itself.

After the HTTPS session is set up, standard HTTP messages are exchanged. The user and server encrypt these messages before sending and decrypt upon receipt.

When communication begins between a user and a server, HTTP/1—version 1.1 of the HTTP protocol—faces performance issues because it blocks on a send and waits for a response. In other words, it is synchronous—it cannot move on to another HTTP request until the current request is finished. If a network or a server is slow, HTTP performs worse. As HTTP is intended primarily to request resources from a server that is often far from the user, network slowness is relevant to HTTP. As web pages grow and become more complex, slowness is a prominent problem.

HTTP/2—version 2 of the HTTP protocol—was created specifically to address performance problems in HTTP/1, and the new version of the protocol differs by adding the following concepts:

Binary rather than textual protocol
    Multiplexed rather than synchronous
    Flow control
    Stream prioritization
    Header compression
    server-push HTTP/1 is a synchronous, single request-and-response protocol. The user sends an HTTP/1 message, and the server gets an HTTP/1 response back. HTTP/2 allows multiple requests to be in progress at the same time, on a single connection, using different streams for each HTTP request or response. This concept of multiple independent requests happening at the same time was made possible by moving to the binary framing layer, where each frame has a stream identifier. The receiving party can reconstruct the full message when all frames for that stream have been received.

Frames are essential to allowing multiple messages to be sent at the same time. Each frame is labeled to indicate which message it belongs to (the stream), which allows two, three, or a hundred messages, for example, to be sent or received at the same time on the same multiplexed connection, as opposed to the six parallel HTTP/1 connections that most browsers allow.

Currently, 14 frame types have been defined for HTTP/2:
    DATA (0x0)
    HEADERS (0x1)
    PRIORITY (0x2)
    RST_STREAM (0x3)
    SETTINGS (0x4)
    PUSH_PROMISE (0x5)
    PING (0x6)
    GOAWAY (0x7)
    WINDOW_UPDATE (0x8)
    CONTINUATION (0x9)
    ALTSVC (0xa)
    ORIGIN (0xc)
    CACHE_DIGEST (proposed)

The PING frame (0x6) is used to measure a round trip from the sender and can also be used to keep an otherwise-unused connection alive. When it receives this frame, the receiver should immediately respond with a similar PING frame. Both PING frames should be sent only on the control stream (stream ID 0). The PING frame defines one flag that can be set in the common frame header. ACK (0x1) should not be set in the initial PING frame, but it should be set on the returning PING frame.

HTTP/2 uses stream prioritization so that the most critical resources can be sent with higher priority. Stream prioritization is implemented by the server sending more frames for higher-priority requests than for lower-priority requests when a queue of frames is waiting to be sent. Stream prioritization also allows greater control than under HTTP/1, in which the separate connections are independent. In HTTP/1, other than not using a connection, it is not possible to prioritize certain connections.

Another important difference between HTTP/1 and HTTP/2 is that HTTP/2 adds the concept of server-push, which allows the server to respond to a request with more than one response. Under HTTP/1, when the home page is returned, the browser must read it and then request the other resources before it starts rendering the page. With HTTP/2 server-push, those resources can be sent with the initial response and should be available when the browser looks to use them.

HTTP/2 is available over unencrypted HTTP, in which it is known as h2c, and over encrypted HTTPS, in which it is known as h2. In practice, all web browsers support HTTP/2 only over HTTPS (h2), so it is used to negotiate HTTP/2 by web browsers. Server-to-server HTTP/2 communication can be over unencrypted HTTP (h2c) or HTTPS (h2).

QUIC is a new UDP-based protocol that aims to replace TCP and other parts of the traditional HTTP stack to address many of its inefficiencies. HTTP/2 introduced some TCP-like concepts (such as packets and flow control), but QUIC replaces TCP and thus is considered HTTP/3. QUIC replaces most of what TCP traditionally provides (the setup, reliability, and congestion control parts), all of HTTPS (to improve the setup delays), and even part of HTTP/2 (the flow control and header compression parts).

QUIC or HTTP/3—version 3 of the HTTP protocol—takes over some of the Transport layer pieces, leaving a lighter HTTP/2 implementation running on top. QUIC is based on the User Datagram Protocol (UDP), which is a light protocol compared with TCP, but is similarly built on top of Internet Protocol (IP). TCP implements reliability in IP for the network connection, including retransmission, congestion, and flow control. These features normally are necessary, but in HTTP/2, they introduce inefficiencies.

UDP is basic compared with TCP. It has the concept of ports, similar to that of TCP, so several UDP-based services can run on the same computer. It also has an optional checksum so that the integrity of UDP packets can be checked. Reliability, ordering, and congestion control do not exist in the context of the protocol itself and have to be provided by the application. If a UDP packet is lost, it will not automatically be resent. If a UDP packet arrives out of order, it is still seen by the higher-level application. UDP was originally used for applications that did not need delivery guarantees (such as video, in which some frames could be dropped without too much loss in service). UDP is also perfect for a multiplexed protocol such as HTTP/2 if that higher-level protocol wants to implement better solutions to these problems than those available in TCP.

In QUIC, some of the Transport layer protocols' frames are removed from the HTTP/2 layer (such as PING and WINDOW_UPDATE frames) and moved to the core QUIC-Transport layer, which is not HTTP-specific. Thus, using HTTP/3 any host can also perform a ping through QUIC.

As mentioned earlier, the general concept of Man-In-The-Middle (MITM) methodology is to intercept HTTPS traffic between the user and the server successfully. In order to execute the MITM, a particular type of HTTPS proxies is used called the MITM proxies. The basic functionality of a MITM proxy is to impersonate the server to the user and in turn to impersonate the user to the server concurrently while observing the traffic from both sides. MITM proxy in a general sense is an open-source HTTPS proxy that is utilized to view all of the HTTP and SSL/HTTPS traffic between the user and the server. Similar to other proxies, MITM proxies accept connection from clients and forward them to the destination server. However, while other proxies typically focus on content filtering or speed optimization through caching, the goal of MITM proxy is to intercept, view and alter these connections in real-time.

In the case of unencrypted HTTP connections, the following section is a brief description illustrating the connection procedure involving the MITM proxy. At first, MITM proxy accepts HTTP connection requests from the user (for example through a web browser). It appears to the user that the connection is established with the remote web server, moreover, the user initiates the TLS handshake indicating the hostname through SNI (Server Name Indication). The MITM proxy, in turn, connects to the web server and establishes a TLS connection using the SNI hostname provided by the user. The web server responds with the matching certificate, which contains the CN (Common Name) and SAN (Subject Alternative Name) values needed to generate the interception certificate. Subsequently, the MITM proxy generates the interception certificate and establishes the TLS connection with the user. Afterwards the user sends the request over the established TLS connection, and the MITM proxy passes the request on to the web server over the TLS connection on the server-side.

However, in the case of SSL-encrypted HTTPS connections, requests and responses between the user and the web server are encrypted end-to-end with a shared secret. In order to intercept this encrypted data transfer in HTTPS connections, the MITM proxy employs an alternative procedure. The MITM proxy dynamically generates certificates to the intended hostname provided by the user for establishing the connection. For instance, if a user requests to connect to a particular website (e.g. https://www.ABC.com), the MITM proxy generates a certificate for that specific web site and signs it. The MITM proxy uses its internal certificate authority (CA) to sign the generated certificate. Thus, the connection will be established, and the MITM proxy will be able to intercept and view the traffic between the user and the web server. This method is also known as the HTTPS proxying. However, for successful implementation of HTTPS proxying, the user must know the certificate authority (CA) key of the MITM proxy.

For both HTTP and HTTPS proxying, the server running MITM proxy must be able to intercept the IP packets which means that the MITM proxy server should be present in the way of the packet path. For this purpose, the default gateway in User Device is usually changed to the MITM proxy server address.

There are several problems associated with the standard flow of executing a scraping request against a content platform that makes its resources available through the Internet. Companies with a web presence often develop a selective stance toward scraping parties, with reasons varying from the increase in capacity utilization to the effect data scraping may have on the business model of the data owner. There are techniques that websites use to react to scraping activities during the crawling stage, i.e., the stage of actually obtaining the data from the source by the scraping application initiating a connection with the web site and submitting the prepared request for a web page.

For example, a web site may try to identify the party submitting the request by a parameter that is part of the request, compare the identifying information obtained with the pre-defined list of guidelines for users or categories of users, and act upon the request accordingly, e.g., allow it through, block it to prevent further access, register the requesting party in an internal database, create a fingerprint for the requesting party and register it in a corresponding database, share the resultant information with other parties, or any combination thereof.

Another method of recognizing the behavior of interest may involve observing the rate of actions (or actions over time) registered from a particular IP address, since humans normally perform actions slower than an automated toolset would. An alternative method may be identifying the request as coming from a system already identified as a scraping platform or a system associated with such a platform. Adapting to the customized policies web scrapers often choose to employ proxies and perform web scraping through multiple proxy IP addresses, thus masking the real IP address of the web scraper. This method both increases the speed of scraping and helps avoid impediments due to a single block-listed IP address since the scraping activity would be distributed across the IP addresses of multiple proxy servers.

To solve at least these problems, in one aspect, the present embodiments detailed herein provide methods of optimizing the operational process of web crawling or web scraping by advanced proxying and fully or partially migrating scraping functionality to the last-mile proxy.

SUMMARY

To mitigate the practice of employing multiple content provider may employ the capabilities of the newer, more advanced versions of HTTP protocol (e.g. HTTP/2 or HTTP/3) and combine them with the ubiquitous network connectivity testing. By analyzing the results of such tests and combining the outcome of the analysis the scraping request destination system may acquire additional visibility into the origins of the requesting system e.g. with high probability of identifying the requests coming through a proxy system.

For web scraping to mitigate negative policy factors, to prevent blocks from the desired data sources, and to collect public data successfully, the scraping applications need to employ methods of adapting to the challenges presented here, as well as multiple others. The methods, among other benefits, may increase the probability of positive evaluation by the web sites by portraying organic behavior and traffic during data collection sessions.

For web scraping to mitigate the detection by web servers, it is proposed to establish multiple connections that terminate at the same endpoint and thus can respond to web server's ping requests in the same order and time frames. Another method for solving the same issue involves transferring some or all of the scraping tasks directly onto a web server or an exit node, so that a user of the proxy server is not in direct connection with the web server. In both cases, the exit node or proxy server have visibility into the encrypted traffic and are able to respond on web server's encrypted ping requests as well as the ubiquitous network connectivity testing.

DETAILED DESCRIPTION

Figure 1:
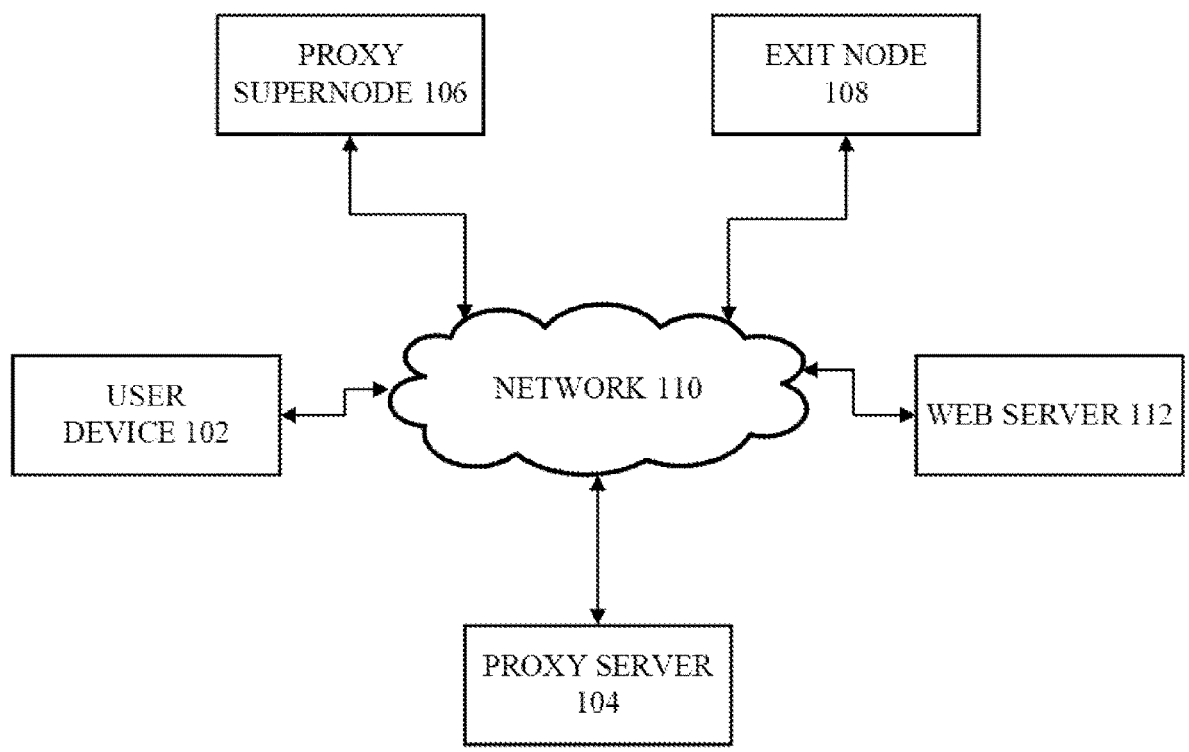
FIG. 1 presents a block diagram of an exemplary architectural depiction of components.

Some general terminology descriptions may be helpful and are included herein for convenience and are intended to be interpreted in the broadest possible interpretation.

User Device 102—a user device can be any suitable user computing device including, but not limited to, a smartphone, a tablet computing device, a personal computing device, a laptop computing device, a gaming device, a vehicle infotainment device, a smart appliance (e.g., smart refrigerator or smart television), a cloud server, a mainframe, a notebook, a desktop, a workstation, a mobile device, or any other electronic device used for connecting to a proxy server.

Proxy Server 104—an exemplary proxy server (a computer system or systems, or applications) that acts as an intermediary for requests from users seeking resources from other servers. A user connects to the proxy server, requesting some service, such as a file, a connection, a web page, or other resources available from a different server. The proxy server forwards the request through to the actual target resource, or resources, containing the actual content. After obtaining the content, the proxy server normally forwards the content to the original requestor, but other actions by the proxy (e.g. return an error message) can also be performed. In the presented embodiments, a proxy server may not have full visibility into the actual content fetched for the original requestor, e.g. in the case of an encrypted HTTPS session, if the proxy is not the decrypting end-point, the proxy serves as an intermediary blindly forwarding the data without being aware of what is being forwarded. However, it should be noted that the metadata of the response, e.g. HTTP headers are always visible. This functionality is necessary for the proxy to correctly forward the data obtained to the correct requesting party—the end-user or the mediating proxy device.

Proxy Supernode 106—can be a proxy service provider infrastructure that communicates with both the User's Device 102 that sends requests to it and with Exit Node 108 that ultimately services these requests.

Exit Node 108—is the last gateway before the traffic hits the Internet. There can be several proxies used to execute a user's request (like a Proxy Supernode 106 and an Exit Node 108), but Exit Node 108 is the final proxy that contacts the target and retrieves the information from the target. There can be several proxies serving the user's request, forming a proxy chain, passing the request through each proxy, with Exit Node 108 being the last link in the chain that ultimately passes the request to the target. The functionality of an Exit Node 108 can be similar or identical to that of Proxy Server 104.

Web Server 110—is server software or a hardware unit that can receive and respond to User Device 102 requests over the Network 110. A web server can, in general, contain one or more websites. A web server processes incoming network requests over HTTP/1 and HTTP/2 or HTTP/3 and several other protocols. The primary function of a web server is to store, process and deliver web pages to users.

ICMP ping—is a networking application used to test whether a particular host at an IP address is up and reachable. ICMP ping is also used to measure latency between the client host and the target host. It works by sending ICMP "echo request" packets (i.e. ping packets) to the target host and listening for ICMP "echo response" replies (i.e. pong packets). Upon receiving echo responses Web Server 118 measures the Round Trip Time (RTT), records packet loss and calculates a statistical summary of multiple ping-pong exchanges (the minimum, mean, max, standard deviation, and other aggregations of RTTs). Using ICMP ping, Web Server 118 can test an IP address from which an HTTP request is originating. The IP address visible to Web Server 118 will be that of a last-mile or exit node device, be it User Device 102, Proxy Server 104, or Exit Node 108.

HTTP/2 ping—is a ping frame (0x6) within HTTP/2. The ping frame is a mechanism for measuring a minimal round-trip time from the sender, as well as determining whether an idle connection is still functional. Ping frames can be sent from any endpoint. In addition to the frame header, ping frames must contain 8 octets of opaque data in the payload. A sender can include any value it chooses and use those octets in any fashion. Receivers of a ping frame that does not include an ACK flag must send a ping frame with the ACK flag set in response, with an identical payload. Ping responses should be given higher priority than any other frame. Ping frame is used to measure a round trip from the sender and can also be used to keep an otherwise-unused connection alive. When it receives this frame, the receiver should immediately respond with a similar ping frame. Both ping frames should be sent only on the control stream (stream ID 0). The ping frame defines one flag that can be set in the common frame header. ACK (0x1) should not be set in the initial ping frame, but it should be set on the returning ping frame. HTTP/2 ping is formatted in the Opaque Data field and has a length of 64 bits (8 octets). The same data is to be sent in the returning ping request. Using HTTP/2 ping, Web Server 118 can test an RTT to an application at which TLS encryption terminates. TLS encryption will terminate at User Device 102 which contains the browser or other application, used to access Web Server 118.

HTTP/3 QUIC ping—is a ping frame (0x07) within QUIC (used by HTTP/3). Both endpoints can use HTTP/3 QUIC ping frames to verify that their peers are still alive or to check the reachability of the peer. Differently from an HTTP/2 ping frame the HTTP/3 QUIC ping frame contains a variable-length payload. A HTTP/3 QUIC ping frame with an empty Data field causes the packet containing it to be received without any need to respond. An empty HTTP/3 QUIC ping frame can be used to keep a connection alive when an application or application protocol wishes to prevent the connection from timing out. If the data field is not empty, the recipient of this frame must generate a pong frame containing the same data. A pong frame is a reply to a ping frame, similar to a HTTP/2 ping frame with an ACK flag. Thus, a HTTP/3 QUIC ping frame with data functions similarly to a HTTP/2 ping frame. Thus, using QUIC ping, Web Server 118 can also test a RTT to User Device 102 which contains the browser or other application accessing Web Server 118.

In FIG. 1, User Device 102, Proxy Server 104, Proxy Supernode 106, Exit Node 108, and Web Server 112 are connecting to Network 110 to reach each other. The connection can begin from User Device 102 with the target being Web Server 112. Once the connection is initiated, Web Server 112 can respond to User Device 102 requests and server-push data, like ping frames. In the current embodiments, the communication between User Device 102 and Web Server 112 is taking place either through HTTP/2 or HTTP/3 (on the basis of QUIC).

User Device 102 can connect directly to Web Server 112 through Network 110. However, User Device 102 can also use proxies to connect to Web Server 112. If proxies are used, User Device 102 can connect to Proxy Server 104 through Network 110 and then Proxy Server 104 will forward the connection to Web Server 112. In this case, User Device 102 already knows the Proxy Server 104 it wants to use and rallies its connection through it. However, User Device 102 can also choose to use a proxy service provider, like Proxy Supernode 106, that will accept its request for the target (i.e. Web Server 112) through Network 110, then choose Exit Node 108, forward the connection to it, and then Exit Node 108 will connect to Web Server 112 to retrieve targeted data.

Figure 2:
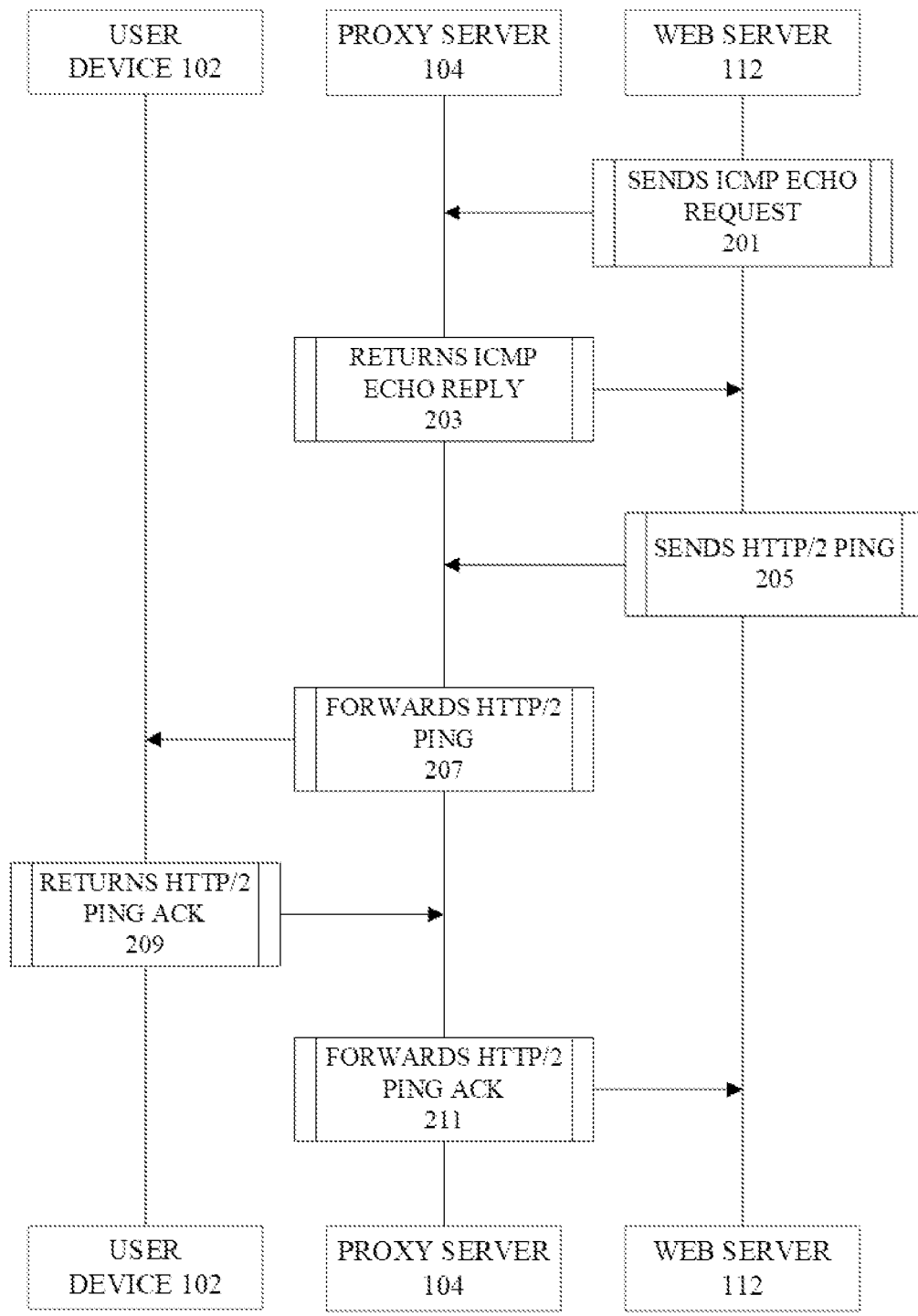
FIG. 2 is a demonstration of an exemplary flow diagram of ICMP ping and HTTP/2 ping travel paths with a proxy server.

FIG. 2 represents an exemplary flow diagram of ICMP ping and HTTP/2 ping travel paths with a proxy server. In step 201, Web Server 112 initiates an ICMP ping message to the incoming IP address. In some embodiments, a particular user has already made an HTTP request to Web Server 112 and Web Server 112 has the visibility of which IP the request came from. Thus, Web Server 112 can take the IP address from a previous request and make an ICMP echo request to it. ICMP is a transport-level protocol within TCP/IP that communicates information about network connectivity. However, other embodiments can use other applications and/or protocols to generate ping messages, like fping, hping, nping, and others. In the current embodiment, Web Server 112 sends an ICMP echo request to the incoming IP address. The IP address visible to Web Server 112 will always be that of a last-mile proxy or exit node, thus if Proxy Server 104 is used, Web Server 112 will detect the IP address of Proxy Server 104 and send an ICMP echo request to it.

In step 203, Proxy Server 104 receives ICMP echo request and responds by returning an ICMP echo reply message. An ICMP echo reply message can be mandatory for all hosts, and should include the exact payload received in an ICMP echo request. The payload can include a timestamp indicating the time of transmission. This allows Web Server 112 to compute the round trip time.

In step 205, Web Server 112 sends an HTTP/2 ping frame to User Device 102. It is assumed that Web Server 112 and User Device 102 already have an HTTP/2 connection established and stream ID_0 is open for Web Server 112 to use since HTTP/2 ping frames can only be sent through stream ID_0. Since all HTTP/2 server-to-user communication happens with encryption, also known as h2, the traffic between Web Server 112 and User Device 102 will be encrypted until it reaches its final destination. This means that traffic is encrypted at Web Server 112 with the public key of User Device 102 and can only be decrypted at User Device 102 with its private key. Likewise, traffic is encrypted at User Device 102 with the public key of Web Server 112 and can only be decrypted at Web Server 112 with its private key. Thus, in step 205, Web Server 112 formulates an h2 ping frame and sends it to User Device 102.

Because h2 traffic is encrypted, ping frames are not distinguishable from other frames by an intermediary proxy, in this case, by Proxy Server 104 which cannot decrypt the frames and blindly passes them on to its user, i.e. User Device 102. Thus, in step 207, Proxy Server 104 simply forwards the HTTP/2 ping to User Device 102.

In step 209, User Device 102 receives HTTP/2 ping and, according to the protocol specification, must return an HTTP/2 ping with an ACK flag to Web Server 112. Receivers of a ping frame that does not include an ACK flag must send a ping frame with the ACK flag set in response, with an identical payload. Ping responses should be given higher priority than any other frame, since a ping frame is used to measure a round trip from the sender. User Device 102 sends the response through Proxy Server 104, i.e. through an already established HTTP connection.

In step 211, Proxy Server 104, which cannot decrypt the traffic, blindly passes an HTTP/2 ping frame with an ACK flag to Web Server 112. Proxy Server 104 simply forwards the response to Web Server 112 without being able to modify it.

The processes of ICMP ping and HTTP/2 ping are comparable to each other in terms of time it takes them to complete. Moreover, it can be compared in terms of steps or hops in the network that it takes them to reach the destination and get back. In one embodiment, where Proxy Server 104 is used, it takes two extra hops to complete an HTTP/2 ping. The extra hops take time to complete, thus the RTT of the HTTP/2 ping is predictably longer than that of ICMP ping. In some embodiments, to achieve a calculation of the RTTs and their comparison Web Server 112 can choose to begin the ICMP ping (step 201) and HTTP/2 ping (step 205) at the same time. In other embodiments, it can wait for one type of ping to return before sending another type of ping. The order of the pings does not change the overall functionality of the embodiments.

Figure 3:
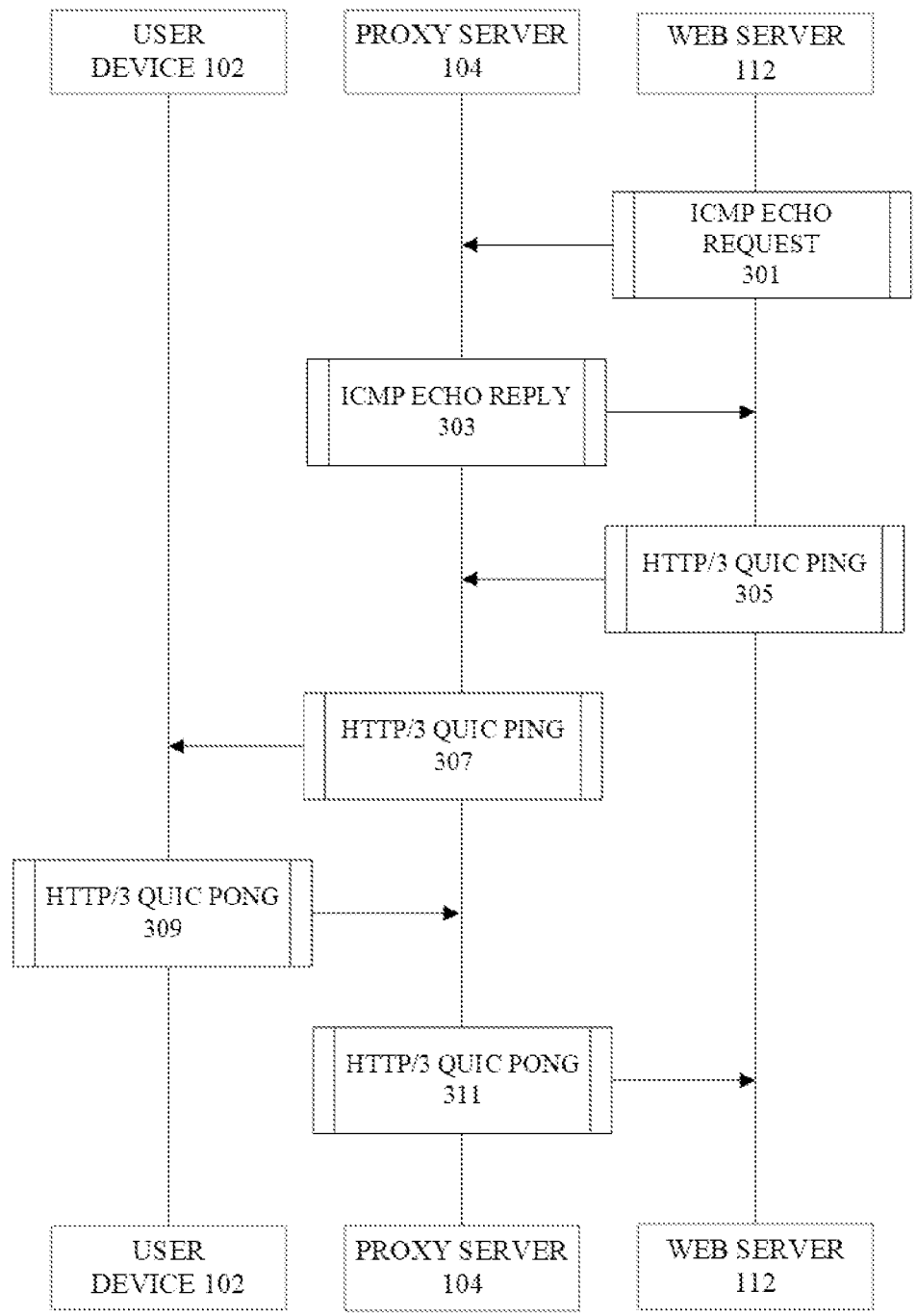
FIG. 3 shows an exemplary flow diagram of ICMP ping and HTTP/3 QUIC ping travel paths with a proxy server.

FIG. 3 represents an exemplary flow diagram of ICMP ping and HTTP/3 QUIC ping travel paths with a proxy server. In step 301, Web Server 112 initiates an ICMP ping message to the incoming IP address. In some embodiments, a particular user has already made an HTTP request to Web Server 112 and Web Server 112 has the visibility of which IP the request came from. Thus, Web Server 112 can take the IP address from a previous request and make an ICMP echo request to it. Other embodiments can use other applications and/or protocols to generate ping messages, like fping, hping, nping, and others. In the current embodiment, Web Server 112 sends an ICMP echo request to the incoming IP address. The IP address visible to Web Server 112 will always be that of a last-mile proxy or exit node, thus if Proxy Server 104 is used, Web Server 112 will detect the IP address of Proxy Server 104 and send an ICMP echo request to it.

In step 303, Proxy Server 104 receives an ICMP echo request and responds by returning an ICMP echo reply message. An ICMP echo reply message is mandatory for all hosts, and must include the exact payload received in ICMP echo request. The payload can include a timestamp indicating the time of transmission. This allows Web Server 112 to compute the RTT.

In step 305, Web Server 112 sends an HTTP/3, otherwise called HTTP/3 QUIC ping frame to User Device 102. Differently from an HTTP/2 ping frame, the HTTP/3 QUIC ping frame contains a variable-length payload. But if the data field is not empty, User Device 102 must generate a pong frame containing the same data. A pong frame is a reply to a ping frame, similar to a HTTP/2 ping frame with an ACK flag. Thus, using QUIC ping, Web Server 118 can also test a RTT to User Device 102 which contains the browser or other application accessing Web Server 118.

Because QUIC traffic is encrypted by default, HTTP/3 QUIC ping frames are not distinguishable from other frames by an intermediary proxy, in this case, by Proxy Server 104 which cannot decrypt the frames and blindly passes them on to its user, i.e. User Device 102. Thus, in step 307, Proxy Server 104 simply forwards the HTTP/3 QUIC ping to User Device 102.

In step 309, User Device 102 receives HTTP/3 QUIC ping and, according to the protocol, must return a HTTP/3 QUIC pong message to Web Server 112.

In step 311, Proxy Server 104, which cannot decrypt the traffic, blindly passes a HTTP/3 QUIC pong message to Web Server 112. Proxy Server 104 simply forwards the response to Web Server 112 without being able to modify it.

The processes of ICMP ping and HTTP/3 QUIC ping are comparable to each other in terms of time it takes them to complete. Moreover, it can be compared in terms of steps or hops in the network that it takes them to reach the destination and get back. In one embodiment, where Proxy Server 104 is used, it takes two extra hops to complete an HTTP/3 ping. The extra hops take time to complete, thus the RTT of the HTTP/3 QUIC ping is predictably longer than that of ICMP ping. In some embodiments, to achieve a calculation of the RTTs and their comparison Web Server 112 can choose to begin the ICMP ping (step 301) and HTTP/3 QUIC ping (step 305) at the same time. In other embodiments, it can wait for one type of ping to return before sending another type of ping. The order of the pings does not change the overall functionality of the embodiments.

Figure 4:
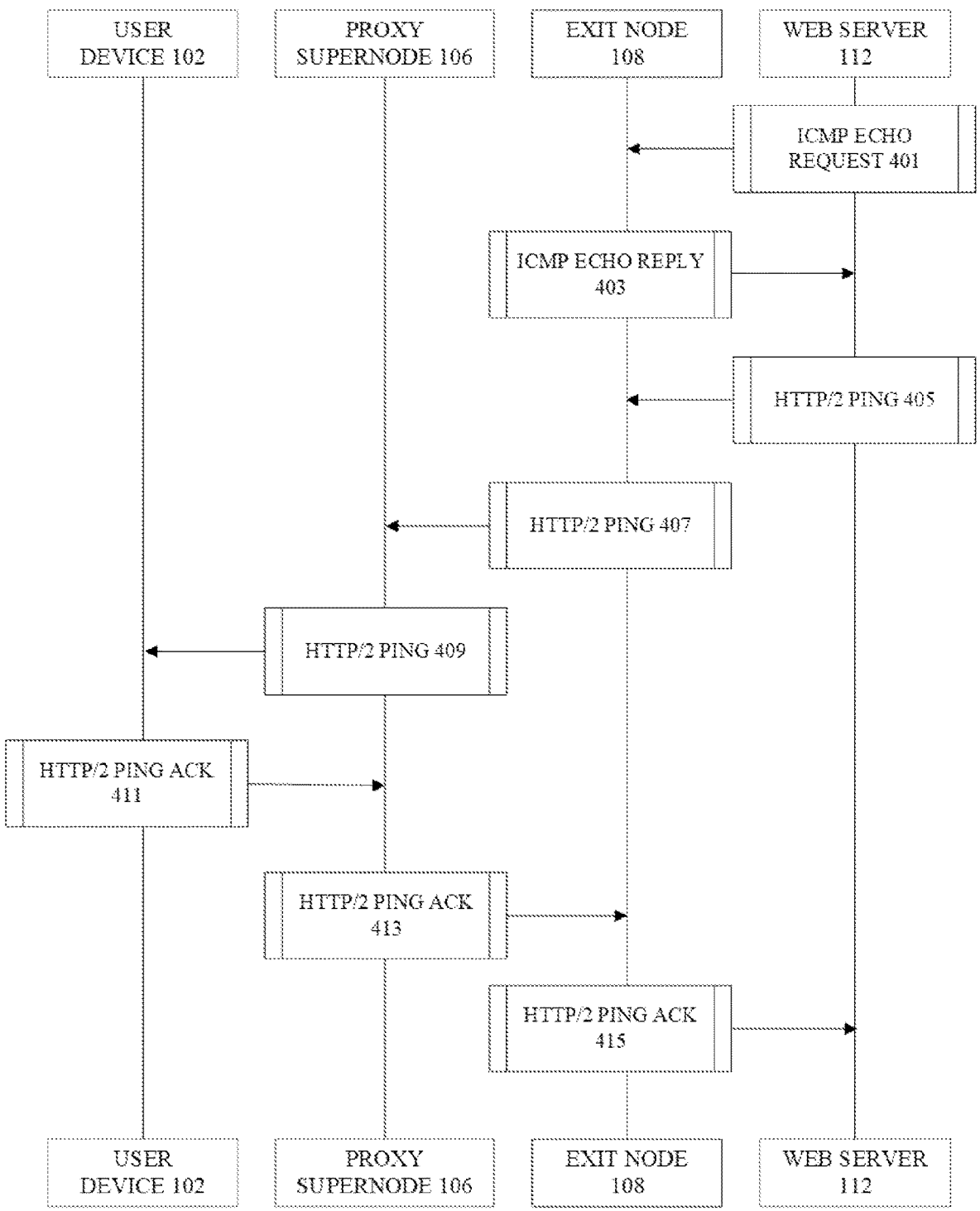
FIG. 4 depicts an exemplary flow diagram of ICMP ping and HTTP/2 ping travel paths with a proxy supernode and exit node.

FIG. 4 represents an exemplary flow diagram of ICMP ping and HTTP/2 ping travel paths with a proxy supernode and exit node. In step 401, Web Server 112 initiates an ICMP ping message to the incoming IP address. In some embodiments, a particular user has already made an HTTP request to Web Server 112 and Web Server 112 has the visibility of which IP the request came from. Thus, Web Server 112 can take the IP address from a previous request and make an ICMP echo request to it. However, other embodiments can use other applications and/or protocols to generate ping messages, like fping, hping, nping, and others. In the current embodiment, Web Server 112 sends an ICMP echo request to the incoming IP address. The IP address visible to Web Server 112 will always be that of a last-mile proxy or exit node, thus if Exit Node 108 is used, Web Server 112 will detect the IP address of Exit Node 108 and send an ICMP echo request to it.

In step 403, Exit Node 108 receives ICMP echo request and responds by returning an ICMP echo reply message. An ICMP echo reply message is mandatory for all hosts, and must include the exact payload received in ICMP echo request. The payload can include a timestamp indicating the time of transmission. This allows Web Server 112 to compute the round trip time.

In step 405, Web Server 112 sends an HTTP/2 ping frame to User Device 102. It is assumed that Web Server 112 and User Device 102 already have an HTTP/2 connection established and stream ID_0 is open for Web Server 112 to use since HTTP/2 ping frames can only be sent through stream ID_0. Since all HTTP/2 server-to-user communication happens with encryption, also known as h2, the traffic between Web Server 112 and User Device 102 will be encrypted until it reaches its final destination. This means that traffic is encrypted at Web Server 112 with the public key of User Device 102 and can only be decrypted at User Device 102 with its private key. Likewise, traffic is encrypted at User Device 102 with the public key of Web Server 112 and can only be decrypted at Web Server 112 with its private key. Thus, in step 405, Web Server 112 formulates an h2 ping frame and sends it to User Device 102.

Because h2 traffic is encrypted, ping frames are not distinguishable from other frames by an intermediary proxy, in this case, by Exit Node 108 and Proxy Supernode 106 that cannot decrypt the frames and blindly pass them on to their user, i.e. User Device 102. Thus, in step 407, Proxy Server 104 simply forwards the HTTP/2 ping to Proxy Supernode 106.

Proxy Supernode 106 is an exit node service provider. Usually, a User Device 102 connects to Proxy Supernode 106 to make requests and Proxy Supernode 106 selects the most fitting exit node to relay the requests. Thus, User Device 102, Proxy Supernode 106, and a selected Exit Node 108 can form a proxy chain to a Web Server 112. H2 traffic is being transferred from a User Device 102 to Web Server 112 transparently through the proxy chain since it is encrypted and none of the mediating parties can decrypt it. Therefore, in step 409 Proxy Supernode 106 transfers the HTTP/2 ping message to a User Device 102.

In step 411, User Device 102 receives HTTP/2 ping and, according to the protocol, must return an HTTP/2 ping with an ACK flag to Web Server 112. Receivers of a ping frame that does not include an ACK flag must send a ping frame with the ACK flag set in response, with an identical payload. Ping responses should be given higher priority than any other frame, since a ping frame is used to measure a round trip from the sender. User Device 102 sends the response through the proxy chain, beginning with Proxy Supernode 106.

In step 413, Proxy Supernode 106, which cannot decrypt the traffic, blindly passes an HTTP/2 ping frame with an ACK flag to Exit Node 108.

Similarly, in step 415, Exit Node 108 passes an HTTP/2 ping frame with an ACK flag to Web Server 112.

The processes of ICMP ping and HTTP/2 ping are comparable to each other in terms of time it takes them to complete. Moreover, it can be compared in terms of steps or hops in the network that it takes them to reach the destination and get back. In one embodiment, where both a Proxy Supernode 106 and an Exit Node 108 are used, it takes four extra hops to complete an HTTP/2 ping. The extra hops take time to complete, thus the RTT of the HTTP/2 ping is predictably longer than that of ICMP ping. In some embodiments, to achieve a calculation of the RTTs and their comparison Web Server 112 can choose to begin the ICMP ping (step 401) and HTTP/2 ping (step 405) at the same time. In other embodiments, it can wait for one type of ping to return before sending another type of ping. The order of the pings does not change the overall functionality of the embodiments.

Figure 5:
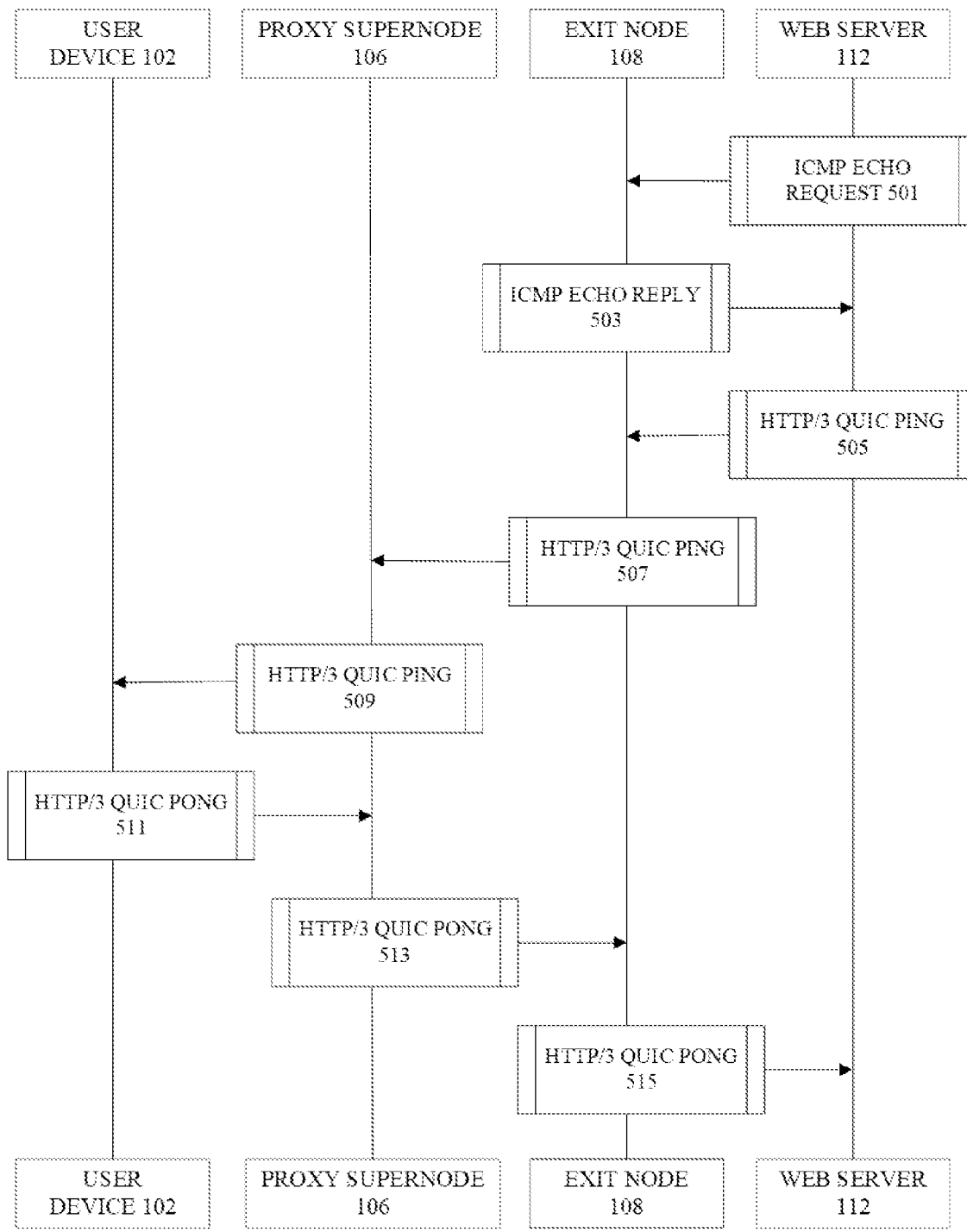
FIG. 5 shows an exemplary flow diagram of ICMP ping and HTTP/3 QUIC ping travel paths with a proxy supernode and exit node.

FIG. 5 represents an exemplary flow diagram of ICMP ping and HTTP/3 QUIC ping travel paths with a proxy supernode and exit node. In step 501, Web Server 112 initiates an ICMP ping message to the incoming IP address. In some embodiments, a particular user has already made an HTTP request to Web Server 112 and Web Server 112 has the visibility of which IP the request came from. Thus, Web Server 112 can take the IP address from a previous request and make an ICMP echo request to it. However, other embodiments can use other applications and/or protocols to generate ping messages, like fping, hping, nping, and others. In the current embodiment, Web Server 112 sends an ICMP echo request to the incoming IP address. The IP address visible to Web Server 112 will always be that of a last-mile proxy or exit node, thus if Exit Node 108 is used, Web Server 112 will detect the IP address of Exit Node 108 and send an ICMP echo request to it.

In step 503, Exit Node 108 receives ICMP echo request and responds by returning an ICMP echo reply message. An ICMP echo reply message is mandatory for all hosts, and must include the exact payload received in ICMP echo request. The payload can include a timestamp indicating the time of transmission. This allows Web Server 112 to compute the round trip time.

In step 505, Web Server 112 sends an HTTP/3, otherwise called HTTP/3 QUIC ping frame to User Device 102. Differently from an HTTP/2 ping frame, the HTTP/3 QUIC ping frame contains a variable-length payload. Empty ping frames are only used to keep a connection alive. But if the data field is not empty, User Device 102 must generate a pong frame containing the same data. A pong frame is a reply to a ping frame, similar to a HTTP/2 ping frame with an ACK flag. Thus, using QUIC ping, Web Server 118 can also test a RTT to User Device 102 which contains the browser or other application accessing Web Server 118.

Because QUIC traffic is encrypted by default, HTTP/3 QUIC ping frames are not distinguishable from other frames by any intermediary proxy. Thus, in step 507, Exit Node 108 simply forwards the HTTP/3 QUIC ping to Proxy Supernode 106.

Proxy Supernode 106 is an exit node service provider. Usually, a User Device 102 connects to Proxy Supernode 106 to make requests and Proxy Supernode 106 selects the most fitting exit node to relay the requests. Thus, User Device 102, Proxy Supernode 106, and a selected Exit Node 108 can form a proxy chain to a Web Server 112. QUIC traffic is being transferred from a User Device 102 to Web Server 112 transparently through the proxy chain since it is encrypted and none of the mediating parties can decrypt it. Therefore, in step 509 Proxy Supernode 106 transfers the HTTP/3 QUIC ping message to a User Device 102.

In step 511, User Device 102 receives HTTP/3 QUIC ping and, according to the protocol, must return a HTTP/3 QUIC pong message to Web Server 112 through the proxy chain.

In step 513, Proxy Supernode 106, which cannot decrypt the traffic, blindly passes an HTTP/3 QUIC pong message to Exit Node 108.

Similarly, in step 515, Exit Node 108 passes an HTTP/3 QUIC pong message to Web Server 112.

Figure 6A:
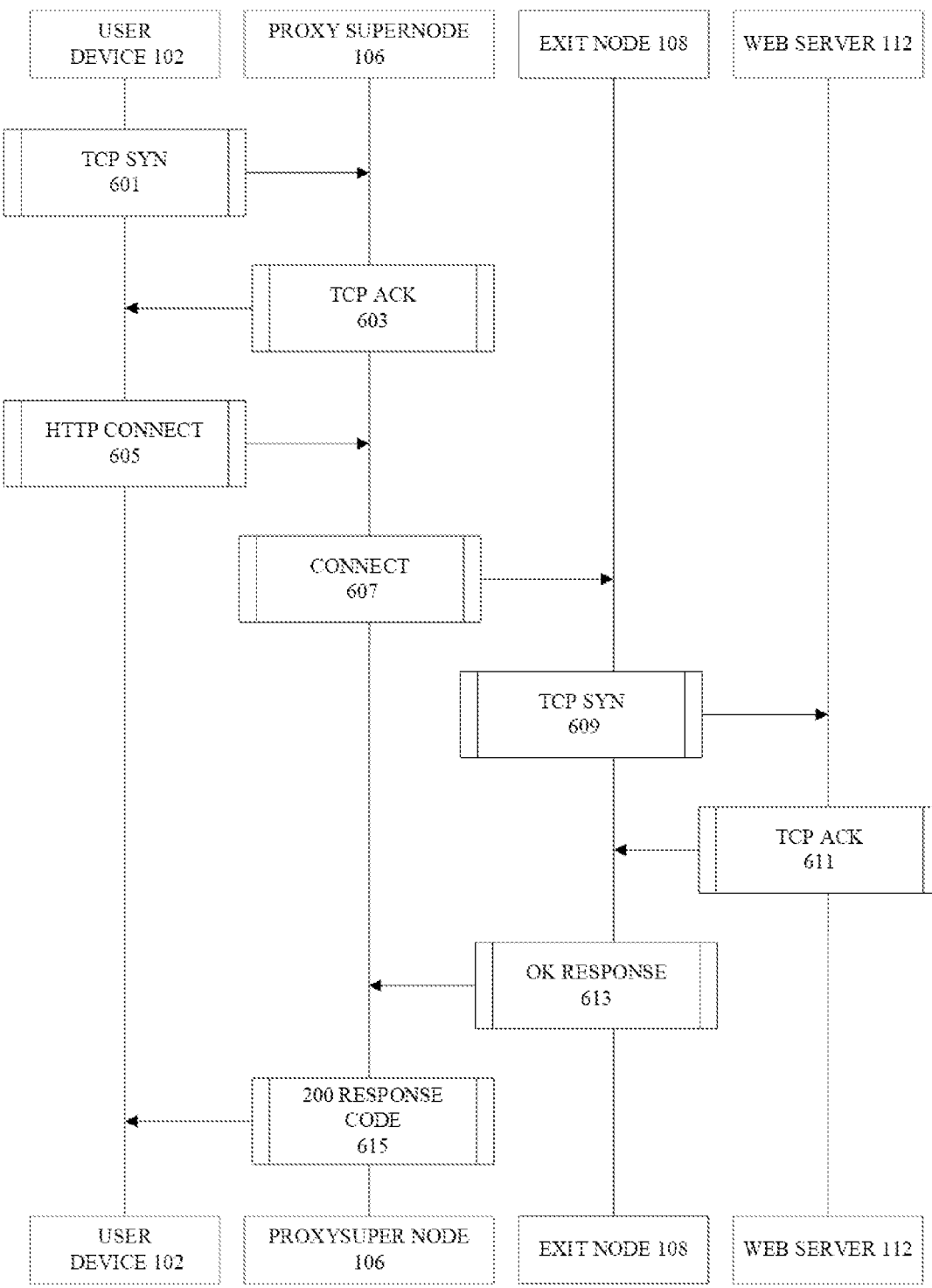
FIG. 6A demonstrates an exemplary flow diagram of intercepted proxy synchronization when proxy supernode is used over HTTP/2.

FIG. 6A shows an exemplary flow diagram of intercepted proxy synchronization when proxy supernode is used over HTTP/2. In step 601, User Device 102 initiates a TCP handshake with Proxy Supernode 106. More precisely, User Device 102 sends a TCP SYN message to an IP address of Proxy Supernode 106 which is the first step of the TCP handshake.

In step 603, Proxy Supernode 106 responds to the TCP handshake initiated by User Device 102. More precisely, the response by Proxy Supernode 106 can be a SYN/ACK message. There can be more messages exchanged as part of the handshake, like an ACK message sent by User Device 102 to Proxy Supernode 106. However, this does not change the overall functioning of the embodiments. Steps 601 and 603 are meant to include all steps necessary to complete a TCP handshake between User Device 102 and Proxy Supernode 106.

In step 605, once a TCP connection is established, User Device 102 sends an HTTP connect request to Proxy Supernode 106. The particular protocol of communication does not change the functioning of the embodiments.

In step 607, Proxy Supernode 106 connects to Exit Node 108. The connection between Proxy Supernode 106 and Exit Node 108 can be implemented through a variety of available protocols, most common being Proxy Protocol, HTTP, IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic.

In step 609, Exit Node 108 initiates a TCP handshake with Web Server 112. More precisely, Exit Node 108 sends a TCP SYN message to Web Server 112 which is the first step of the TCP handshake.

In step 611, Proxy Supernode 106 responds to the TCP handshake initiated by User Device 102. More precisely, the response by Web Server 112 can be a SYN/ACK message. There can be more messages exchanged as part of the handshake, like an ACK message sent by Exit Node 108 to Web Server 112. However, this does not change the overall functioning of the embodiments. Steps 609 and 611 are meant to include all steps necessary to complete a TCP handshake between Exit Node 108 and Web Server 112.

In step 613, once a TCP connection between Exit Node 108 and Web Server 112 is established, Exit Node 108 returns an OK message to Proxy Supernode 106 to indicate that the connection was successful. The particular type of message being sent can depend on the protocol employed between Exit Node 108 and Proxy Supernode 106 but it does not change the overall functionality of the embodiments.

In step 615, Proxy Supernode 106 returns an HTTP "200" success status response code to User Device 102 which indicates that the HTTP request made in step 605 has succeeded.

Figure 6B:
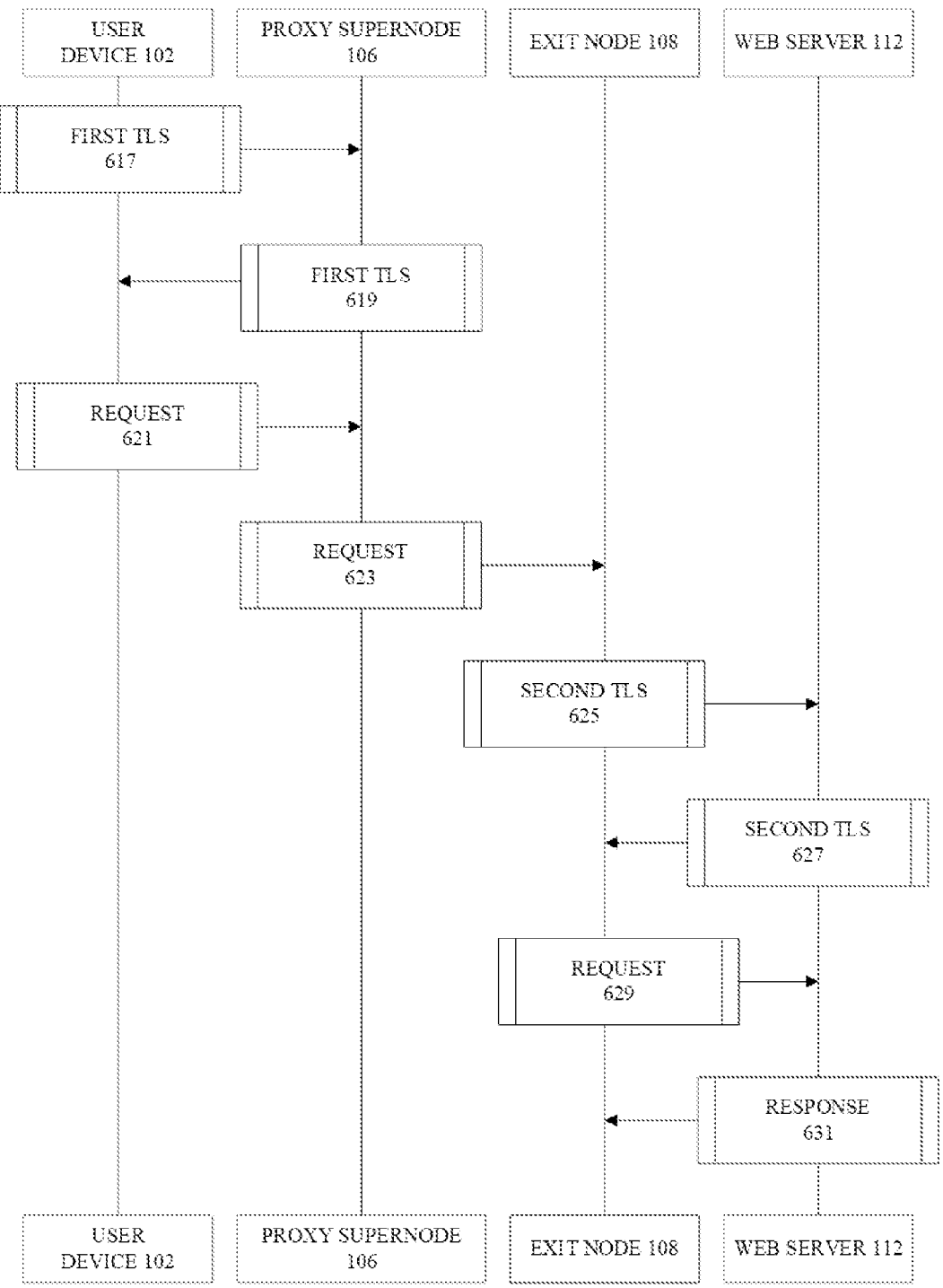
FIG. 6B is the continuation of the exemplary flow diagram of intercepted proxy synchronization when proxy supernode is used over HTTP/2.

FIG. 6B shows the continuation of the exemplary flow diagram of intercepted proxy synchronization when proxy supernode is used over HTTP/2. In step 617, User Device 102 initiates a TLS handshake which is intercepted by Proxy Supernode 106. Proxy Supernode 106 dynamically generates a certificate for Web Server 112 and signs it. Proxy Supernode 106 uses its internal certificate authority (CA) to sign the generated certificate.

In step 619, Proxy Supernode 106 completes the TLS handshake with User Device 102 and establishes a secure HTTPS connection with a certificate that is dynamically signed by an internal CA. Steps 617 and 619 are meant to include all the necessary steps to complete a first TLS handshake between Proxy Supernode 106 and User Device 102.

In the current embodiments, the TCP handshake and the TLS handshake are distinguished as two processes. However, in other embodiments they can happen at once. In newer TCP implementations, known as TCP Fast Open, data is exchanged safely during TCP's connection handshake and both handshakes can take place alongside each other. In such a case, steps representing the TLS handshake (617 and 619) would be incorporated into the steps representing the TCP handshake (601 and 603).

In step 621, once a TLS handshake is complete, User Device 102 makes an HTTP request for the content contained on Web Server 112. The request is proxied via Proxy Supernode 106 which receives the request.

In step 623, Proxy Supernode 106 forwards the request from User Device 102 to Exit Node 108.

In step 625, Exit Node 108 initiates a second TLS handshake with Web Server 112. Web Server 112 uses a public certificate signed by a trusted CA.

In step 627, Web Server 112 completes the second TLS handshake with Exit Node 108.

In the current embodiments, the TCP handshake and the TLS handshake are distinguished as two processes. However, in other embodiments they can happen at once. In newer TCP implementations, known as TCP Fast Open, data is exchanged safely during TCP's connection handshake and both handshakes can take place alongside each other. In such a case, steps representing the TLS handshake (625 and 627) would be incorporated into the steps representing the TCP handshake (609 and 611).

In step 629, Exit Node 108 makes an HTTP/2 request to Web Server 112 for the content requested in the initial request from User Device 102.

In step 631, Web Server 112 can return the content requested by Exit Node 108.

Figure 6C:
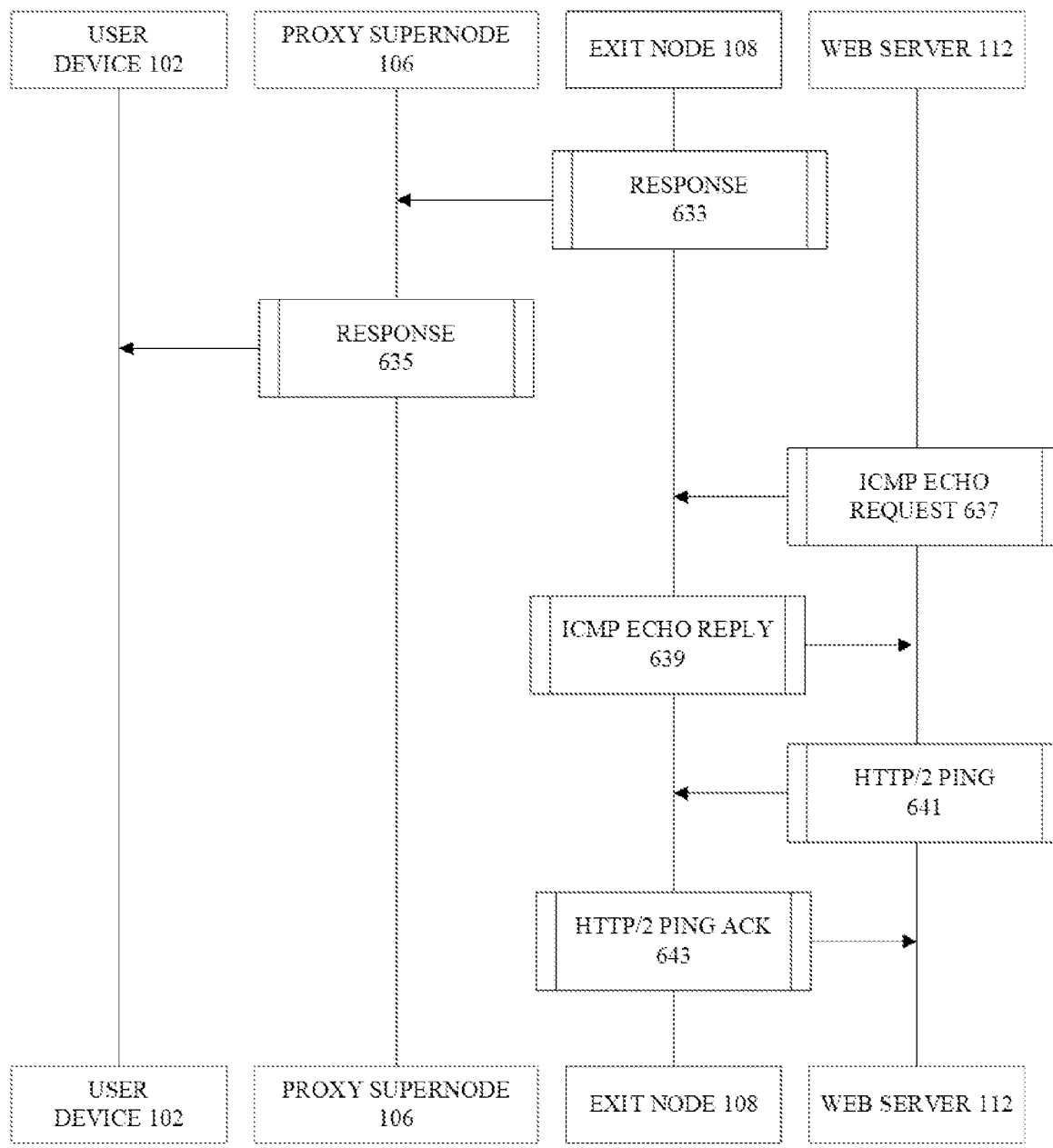
FIG. 6C is the continuation of the exemplary flow diagram of intercepted proxy synchronization when proxy supernode is used over HTTP/2.

FIG. 6C shows the continuation of the exemplary flow diagram of intercepted proxy synchronization when proxy supernode is used over HTTP/2. In step 633, Exit Node 108 forwards the response from Web Server 112 to Proxy Supernode 106.

In step 635, Proxy Supernode 106 forwards the response from Web Server 112 to User Device 102.

In step 637, Web Server 112 initiates an ICMP ping message to the IP address of Exit Node 108. Exit Node 108 has already made an HTTP request to Web Server 112 and Web Server 112 has the visibility of which IP the request came from. Thus, Web Server 112 can take the IP address of Exit Node 108 and make an ICMP echo request to it.

In step 639, Exit Node 108 receives ICMP echo request and responds by returning an ICMP echo reply message. An ICMP echo reply message is required for all hosts, and must include the exact payload received in ICMP echo request. The payload can include a timestamp indicating the time of transmission. This allows Web Server 112 to compute the round trip time.

In step 641, Web Server 112 initiates an HTTP/2 ping message to User Device 102. However, since the connection is proxied, the HTTP/2 ping message reaches Exit Node 108 first.

In step 643, Exit Node 108 receives the HTTP/2 ping message and since the second TLS connection terminates at Exit Node 108, it is able to decrypt traffic and identify the HTTP/2 ping frame. Once Exit Node 108 identifies the HTTP/2 ping frame, it is able to send a response. The response required by the protocol is an HTTP/2 ping frame with an ACK flag containing the same payload as the original message. Exit Node 108 duly responds to the original HTTP/2 ping frame. In different embodiments, Exit Node 108 can choose to also inform Proxy Supernode 106 about the usage of HTTP/2 ping frames but in the current exemplary embodiment, it does not send further information regarding the ping messages to other elements.

Once the HTTP/2 ping frame with an ACK flag reaches Web Server 112, Web Server 112 is able to calculate the RTT of the ping messages. It is noted that since both ICMP and HTTP/2 ping messages were terminated at Exit Node 108, the RTTs of both pings will be virtually identical. Minimal differences can occur due to time taken to encrypt and decrypt HTTP/2 traffic and momentary network perturbations. However, such issues can be compensated by Web Server 112 and will eventually be negligible.

It is also noted that the exact order of steps taken by Web Server 112 does not change the functionality of the embodiments. For example, Web Server 112 can choose to perform pings before responding to any HTTP/2 requests. In that case, steps 637-643 will take place immediately after step 627. Web Server 112 can also choose to respond to several requests before performing pings or their comparisons or it can aggregate several ping RTTs and perform an aggregated statistical analysis, thus repeating steps 637-643 several times. However, this does not change the functionality of the embodiments.

Figure 7A:
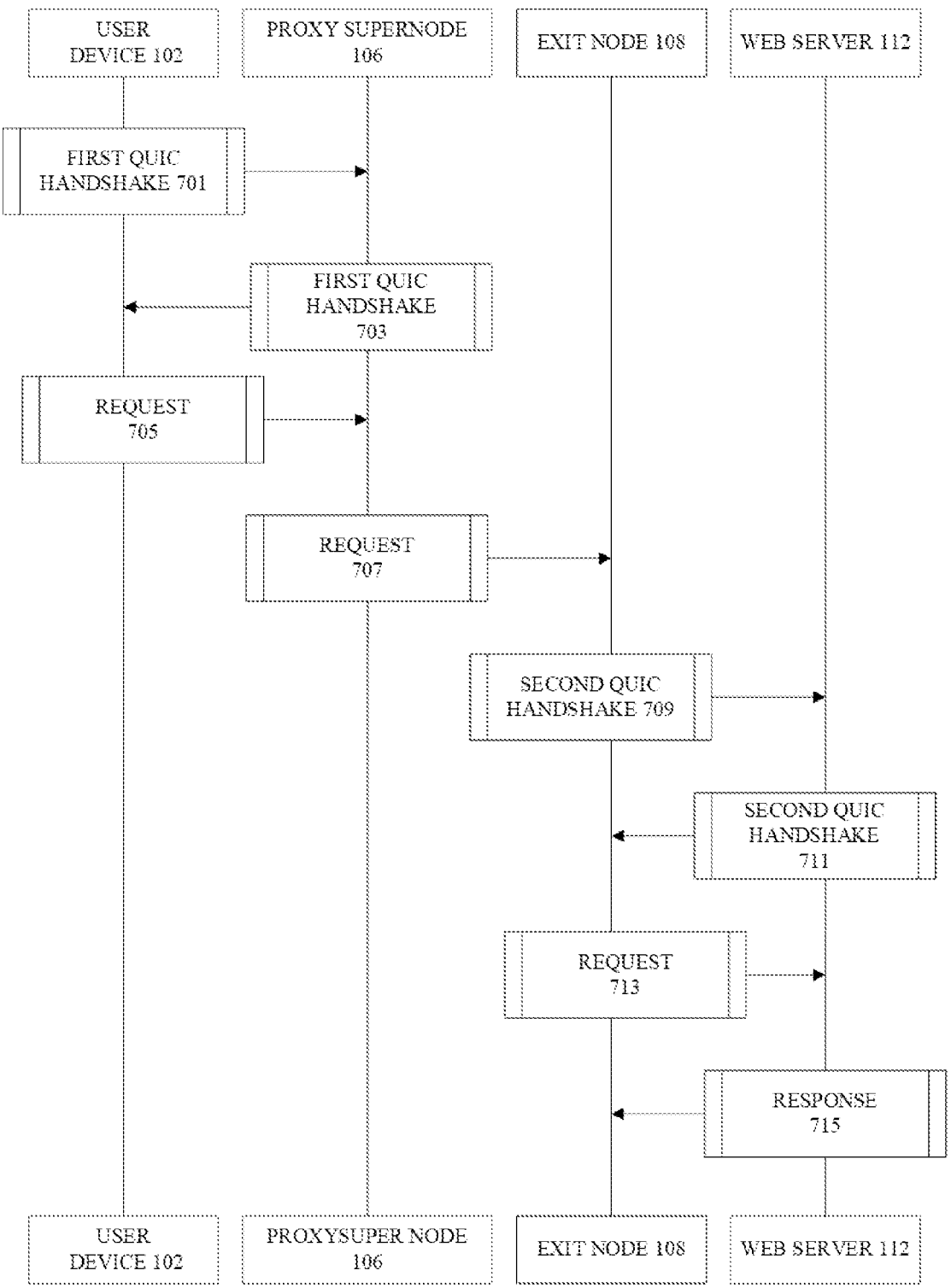
FIG. 7A demonstrates an exemplary flow diagram of intercepted proxy synchronization when proxy supernode is used over HTTP/3.

FIG. 7A shows an exemplary flow diagram of intercepted proxy synchronization when proxy supernode is used over HTTP/3. In step 701, User Device 102 initiates a first QUIC handshake with Proxy Supernode 106. QUIC handshake includes a TLS handshake, which provides authentication of the end-points as well as negotiation of cryptographic parameters.

In step 703, Proxy Supernode 106 responds and completes the QUIC handshake with User Device 102. A particular handshake flow will depend on the parameters of both endpoints, however, one approach includes a 0-RTT cryptographic handshake.

In a 0-RTT handshake, User Device 102 sends an initial crypto packet: Initial[0]: CRYPTO[CH] along with a data packet on stream id "0": 0-RTT[0]: STREAM[0, " . . . "]; Proxy Supernode 106 can respond with the initial crypto packet: Initial[0]: CRYPTO[SH] ACK[0] and continuing negotiating the handshake: Handshake[0] CRYPTO[EE, FIN] over stream id "1": 1-RTT[0]: STREAM[1, " . . . "] ACK[0]. User Device 102 can respond with accepting the handshake: Initial[1]: ACK[0] Handshake[0]: CRYPTO [FIN], ACK[0] over stream id "O": 1-RTT[1]: STREAM[0, " . . . "] ACK[0]. Proxy Supernode 106 then can acknowledge the end of handshake: 1-RTT[1]: HANDSHAKE_DONE, STREAM[3, " . . . "], ACK[1].

However, User Device 102 and Proxy Supernode 106 can use a different handshake flow, for example a 1-RTT cryptographic handshake. This does not change the overall functionality of the embodiments. Steps 701 and 703 are meant to include all necessary steps to complete a QUIC handshake.

Proxy Supernode 106 dynamically generates a certificate for Web Server 112 and signs it. Proxy Supernode 106 uses its internal certificate authority (CA) to sign the generated certificate. Depending on the application used by User Device 102, it may get a warning message that a certificate is not signed by a trusted CA, however, this does not change the functionality of the embodiments. In all intents and purposes the present embodiments should be transparent about using dynamically generated certificates to User Device 102.

In step 705, once a QUIC handshake is complete, User Device 102 makes an HTTP/3 request for content contained on Web Server 112. The request is proxied via Proxy Supernode 106 which receives the request.

In step 707, Proxy Supernode 106 forwards the request from User Device 102 to Exit Node 108.

In step 709, Exit Node 108 initiates a second QUIC handshake with Web Server 112. QUIC handshake includes a TLS handshake, which provides authentication of the end-points as well as negotiation of cryptographic parameters.

In step 711, Web Server 112 responds and completes the QUIC handshake with Exit Node 108. A particular handshake flow will depend on the parameters of both endpoints, however, one approach includes a 0-RTT cryptographic handshake.

However, Exit Node 108 and Web Server 112 can use a different handshake flow, for example a 1-RTT cryptographic handshake. This does not change the overall functionality of the embodiments. Steps 709 and 711 are meant to include all necessary steps to complete a QUIC handshake.

In step 713, Exit Node 108 makes an HTTP/3 request to Web Server 112 for the content requested in the initial request from User Device 102.

In step 715, Web Server 112 can return the content requested by Exit Node 108.

Figure 7B:
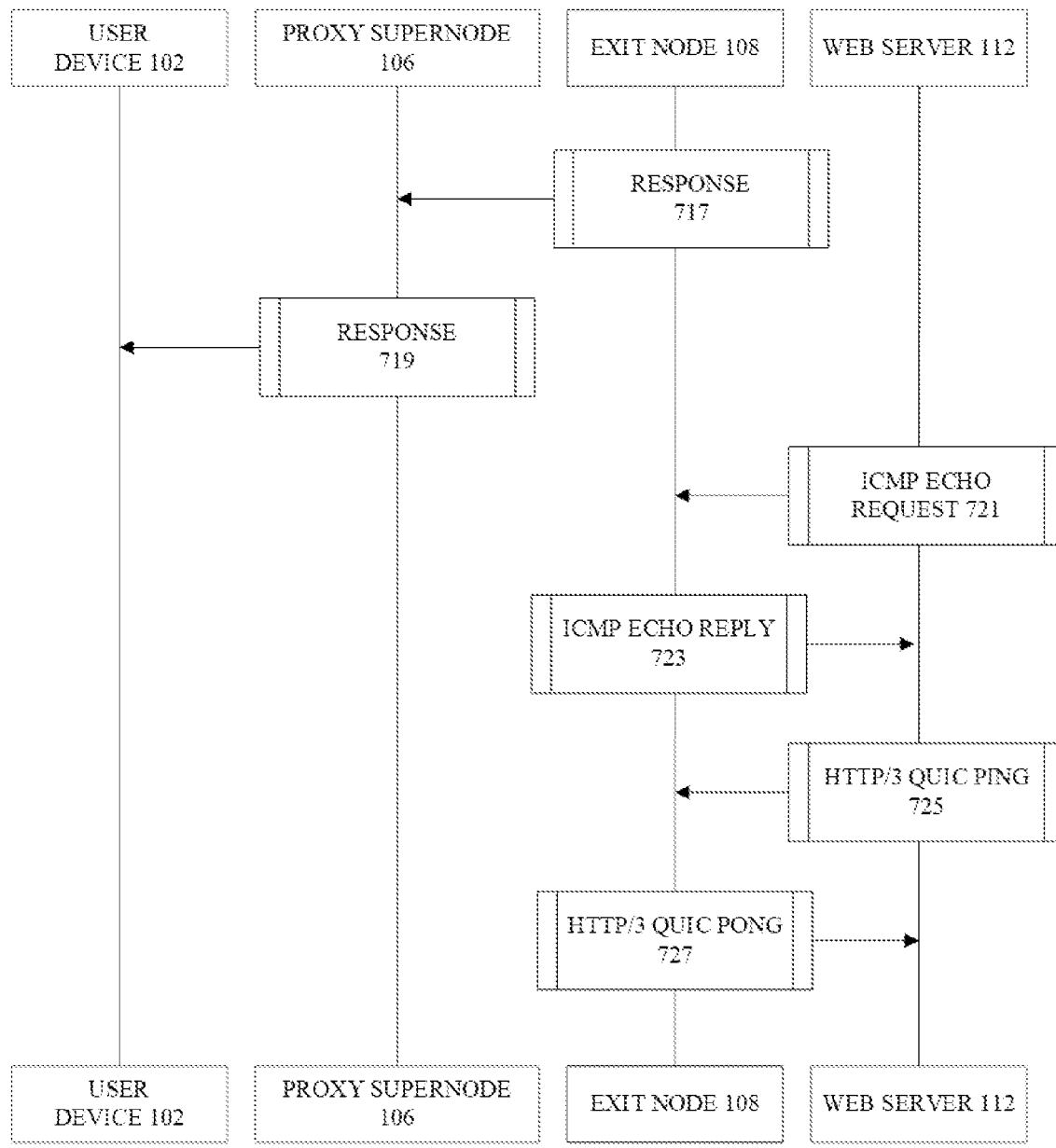
FIG. 7B presents the continuation of the exemplary flow diagram of intercepted proxy synchronization when proxy supernode is used over HTTP/3.

FIG. 7B shows the continuation of the exemplary flow diagram of intercepted proxy synchronization when proxy supernode is used over HTTP/3. In step 717, Exit Node 108 forwards the response from Web Server 112 to Proxy Supernode 106.

In step 719, Proxy Supernode 106 forwards the response from Web Server 112 to User Device 102.

In step 721, Web Server 112 initiates an ICMP ping message to the IP address of Exit Node 108. Exit Node 108 has already made an HTTP request to Web Server 112 and Web Server 112 has the visibility of which IP the request came from. Thus, Web Server 112 can take the IP address of Exit Node 108 and make an ICMP echo request to it.

In step 723, Exit Node 108 receives ICMP echo request and responds by returning an ICMP echo reply message. An ICMP echo reply message is required for all hosts, and must include the exact payload received in ICMP echo request. The payload can include a timestamp indicating the time of transmission. This allows Web Server 112 to compute the round trip time.

In step 725, Web Server 112 initiates an HTTP/3 QUIC ping message to User Device 102. However, since the connection is proxied, the HTTP/3 QUIC ping message reaches Exit Node 108 first.

In step 727, Exit Node 108 receives the HTTP/3 QUIC ping message and since the second TLS connection terminates at Exit Node 108, it is able to decrypt traffic and identify the HTTP/3 QUIC ping frame. Once Exit Node 108 identifies the HTTP/3 QUIC ping frame, it is able to send a response. The response required by the protocol is an HTTP/3 QUIC pong message containing the same payload as the original message. Exit Node 108 duly responds to the original HTTP/3 QUIC ping frame. In different embodiments, Exit Node 108 can choose to also inform Proxy Supernode 106 about the usage of HTTP/3 QUIC ping frames but in the current exemplary embodiment, it does not send further information regarding the ping messages to other elements.

Once the HTTP/3 QUIC pong message reaches Web Server 112, Web Server 112 is able to calculate the RTT of the ICMP and HTTP/3 QUIC ping messages. Because both ICMP and HTTP/3 QUIC ping messages were terminated at Exit Node 108, the RTTs of both pings will be virtually identical. Minimal differences can occur due to time taken to encrypt and decrypt HTTP/3 QUIC traffic and momentary network perturbations. However, such issues can be compensated by Web Server 112 and will eventually be negligible.

It is also important to note that the exact order of steps taken by Web Server 112 does not change the functionality of the embodiments. For example, Web Server 112 can choose to perform pings before responding to any HTTP/3 requests. In that case, steps 721-727 will take place immediately after step 611. Web Server 112 can also choose to respond to several requests before performing pings or their comparisons or it can aggregate several ping RTTs and perform an aggregated statistical analysis, thus repeating steps 721-727 several times. However, this does not change the functionality of the embodiments.

Figure 8A:
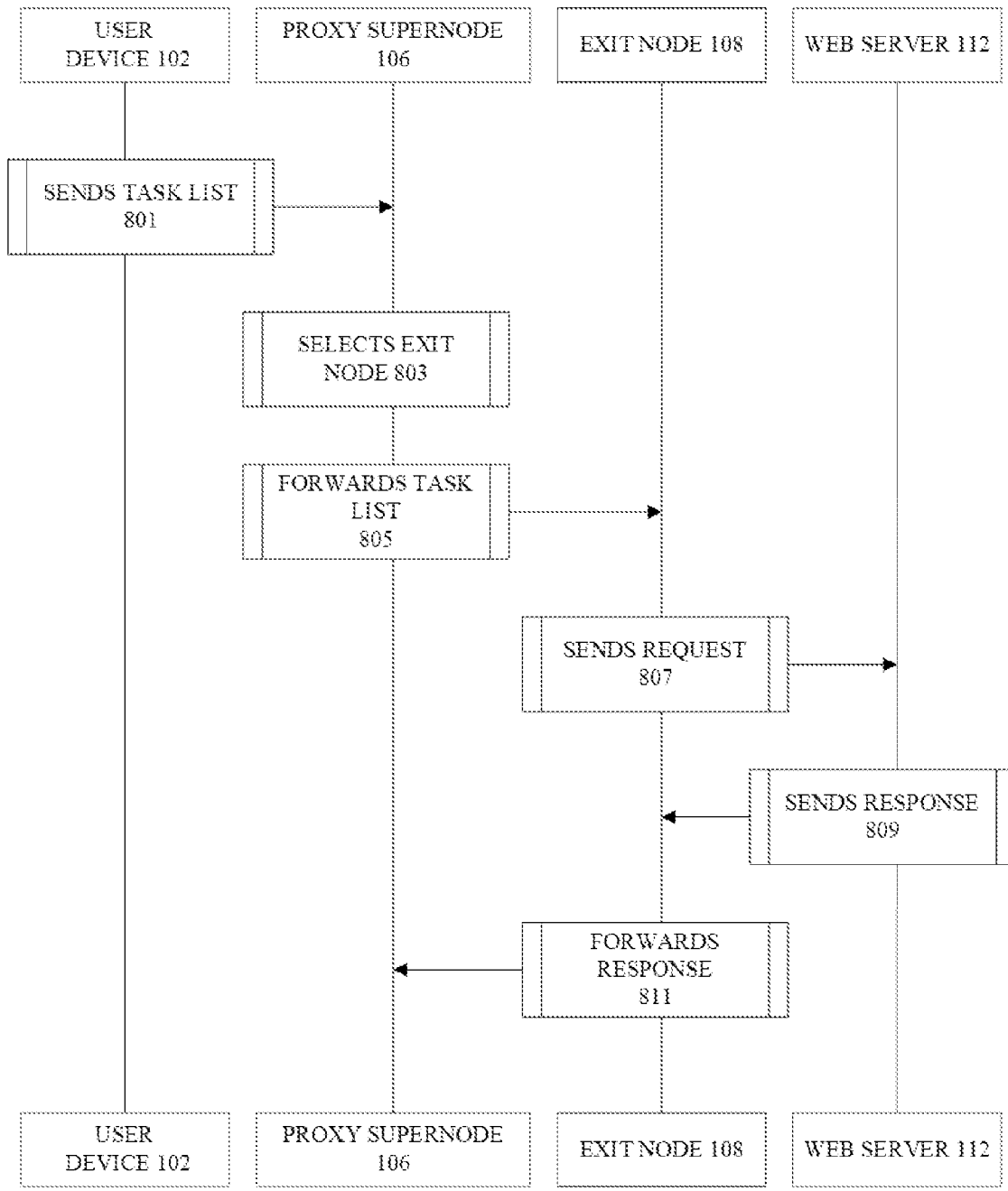
FIG. 8A shows an exemplary flow diagram of synchronization by a task list when proxy supernode is used over HTTP/2.

FIG. 8A shows an exemplary flow diagram of synchronization via a task list when proxy supernode is used over HTTP/2. In step 801, User Device 102 sends a task list to Proxy Supernode 106 that is intended for the target i.e., Web Server 112. A type of request that is listed on the list can be called a "task list request" but will be referred to as simply "request" for simplicity. The task list from User Device 102 may contain a single or several requests for retrieving data (such as weather, online price changes, product data, etc.) from a single or multiple targets. The task list may include a list of URLs of the targets, keywords for data search or ranges of web pages for data retrieval. The task list can be sent from User Device 102 to Web Server 112 through various communication channels, for example, a text message, email or via an API provided by Web Server 112. However, the particular communication method does not change the overall functionality of the embodiments.

Once a task list is received from User Device 102, in step 803, Proxy Supernode 106 selects a suitable exit node from a plurality of exit nodes managed by it. Exit Node 108 denotes the selected suitable exit node through which the task list is relayed unto Web Server 112. The selection of a suitable exit node is carried out by Proxy Supernode 106 based on several conditions such as the type of target or targets, type of requests present in the task list, specific user-defined criteria in the task list, location proximity and performance history of exit nodes. Proxy Supernode 106 can select a single exit node or multiple exit nodes based on the analysis of the aforementioned conditions. Proxy Supernode 106 can choose to dedicate the whole list, parts of the list or individual items of the list to single exit nodes or pools of exit nodes. Pools of exit nodes are ordered or unordered sets of exit nodes that are usually rotated for better performance.

However, the current embodiments are sufficiently revealed by a case in which a single exit node is assigned a list of tasks.

In step 805, Proxy Supernode 106 forwards a task list or a singular task (which still can be understood as a "task list", although containing one item) to Exit Node 108. Upon receiving the task list from Proxy Supernode 106, Exit Node 108 can run or be continually running a web application that is able to formulate web requests to a target, specified in the task list. Usually, the web application includes an automated script (such as a web browser or web scraper) for automated content retrieval. Scripts are computer programs developed to automatically execute actions on behalf of the web application. In such a way, Exit Node 108 can make web requests without manual input.

In step 807, Exit Node 108 makes an HTTP/2 request unto the target i.e., Web Server 112. A type of request that is listed on the list can be called a "task list request" but will be referred to as simply a request for simplicity. Exit Node 108 can make multiple HTTP/2 requests depending upon the nature of the task list unto one or more web servers. Exit Node 108 can make multiple concurrent requests or wait for the requests to be returned in a queue. This will depend on the particular script and web application used but this is not impactful for the current embodiments.

In step 809, Web Server 112 sends back a response for the HTTP/2 request to Exit Node 108. A type of response that is listed on the list can be called a "task list response" but will be referred to as simply "response" for simplicity. Since HTTP/2 is not a synchronous protocol, Web Server 112 can send multiple messages in response to a single request by Exit Node 108. Exit Node 108 can use the web application with automated scripts to extract required information predefined in the task list. In other cases, Exit Node 108 can also choose to store and return raw web pages but this is not an optimized use case. Usually, an automated script extracts the required information. The particular choice of data or its format, however, does not change the overall functionality of the embodiments.

In step 811, Exit Node 108 forwards the gathered response back to Proxy Supernode 106. Exit Node 108 can gather the response for multiple tasks and forward back to Proxy Supernode 106 as a collection of responses or can forward the individual response back to Proxy Supernode 106. The execution of the task list can be performed on additional task list items and the task list response can be grouped with responses from the additional task list items in a bulk file of task list responses, and Exit Node 108 can forward the task list responses from the web server in a bulk file to the user device.

Figure 8B:
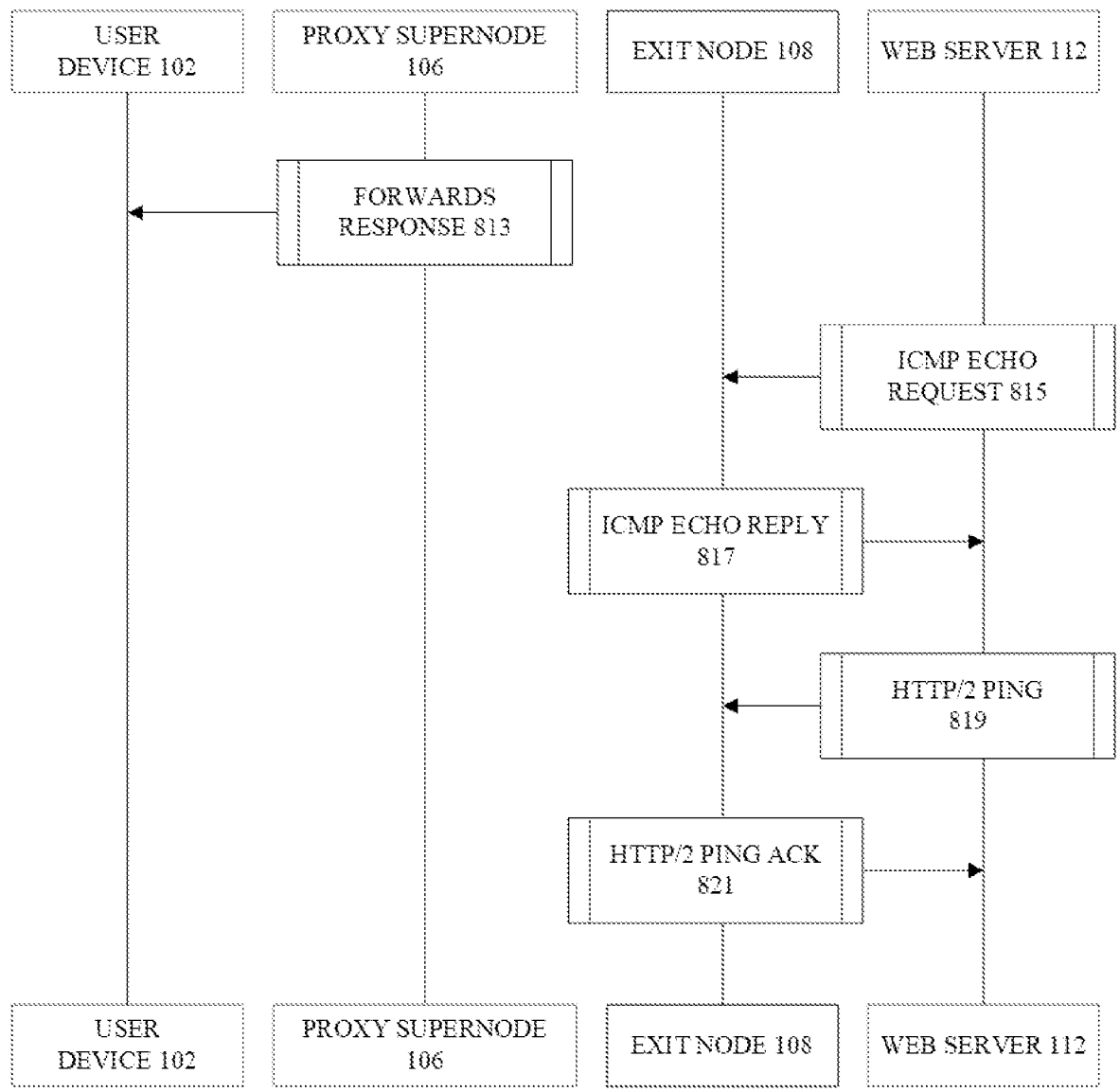
FIG. 8B depicts the continuation of the exemplary flow diagram of synchronization via a task list when a proxy supernode is used over HTTP/2.

FIG. 8B shows the continuation of the exemplary flow diagram of synchronization via a task list when proxy supernode is used over HTTP/2. In step 813, Proxy Supernode 106 forwards back the response received from Exit Node 108 to User Device 102.

In step 815, Web Server 112 initiates an ICMP ping message to the IP address of Exit Node 108. Since Exit Node 108 has already made an HTTP request to Web Server 112, Web Server 112 will have the visibility to the IP address of Exit Node 108 from which the request was sent. Thus, Web Server 112 can take the IP address of Exit Node 108 and make an ICMP echo request to Exit Node 108.

In step 817, Exit Node 108 receives the ICMP echo request and responds by returning an ICMP echo reply message. An ICMP reply message is required for all hosts and must include the exact payload received in the ICMP echo request. The payload can include a timestamp indicating the time of transmission. This allows Web Server 112 to compute the round-trip time for the ICMP echo message.

In step 819, Web Server 112 initiates an HTTP/2 ping message to User Device 102. However, since the connection is proxied through Exit Node 108, the HTTP/2 ping message first reaches Exit Node 108. After receiving the HTTP/2 ping message, Exit Node 108 can decrypt and identify the HTTP/2 ping frame. Subsequently, in step 821, Exit Node 108 is able to send back the response based on the protocol of the HTTP/2 ping frame with ACK flag containing the same payload as the original HTTP/2 ping message. In different embodiments, Exit Node 108 can choose to also inform Proxy Supernode 106 about the usage of HTTP/2 ping frames but in the current exemplary embodiment, Exit Node 108 does not send further information regarding the ping messages to other elements.

Once the HTTP/2 ping frame with an ACK flag reaches Web Server 112, Web Server 112 can calculate the RTT of the ping messages. Because both ICMP and HTTP/2 ping messages were terminated at Exit Node 108, the RTTs of both pings will be virtually identical. However, there can be minimal difference due to the time taken to decrypt and encrypt the HTTP/2 traffic and momentary network perturbations. However, such issues can be compensated by Web Server 112 and will eventually be negligible.

It is also important to note that the exact order of steps taken by Web Server 112 does not change the functionality of the embodiments. For example, Web Server 112 can choose to perform pings before responding to any HTTP/2 requests from Exit Node 108. Web Server 112 can also choose to respond to several requests before performing pings or their comparisons or it can aggregate several ping RTTs and perform an aggregated statistical analysis, thus repeating steps 815-821 several times. However, this does not change the functionality of the embodiments.

Figure 9A:
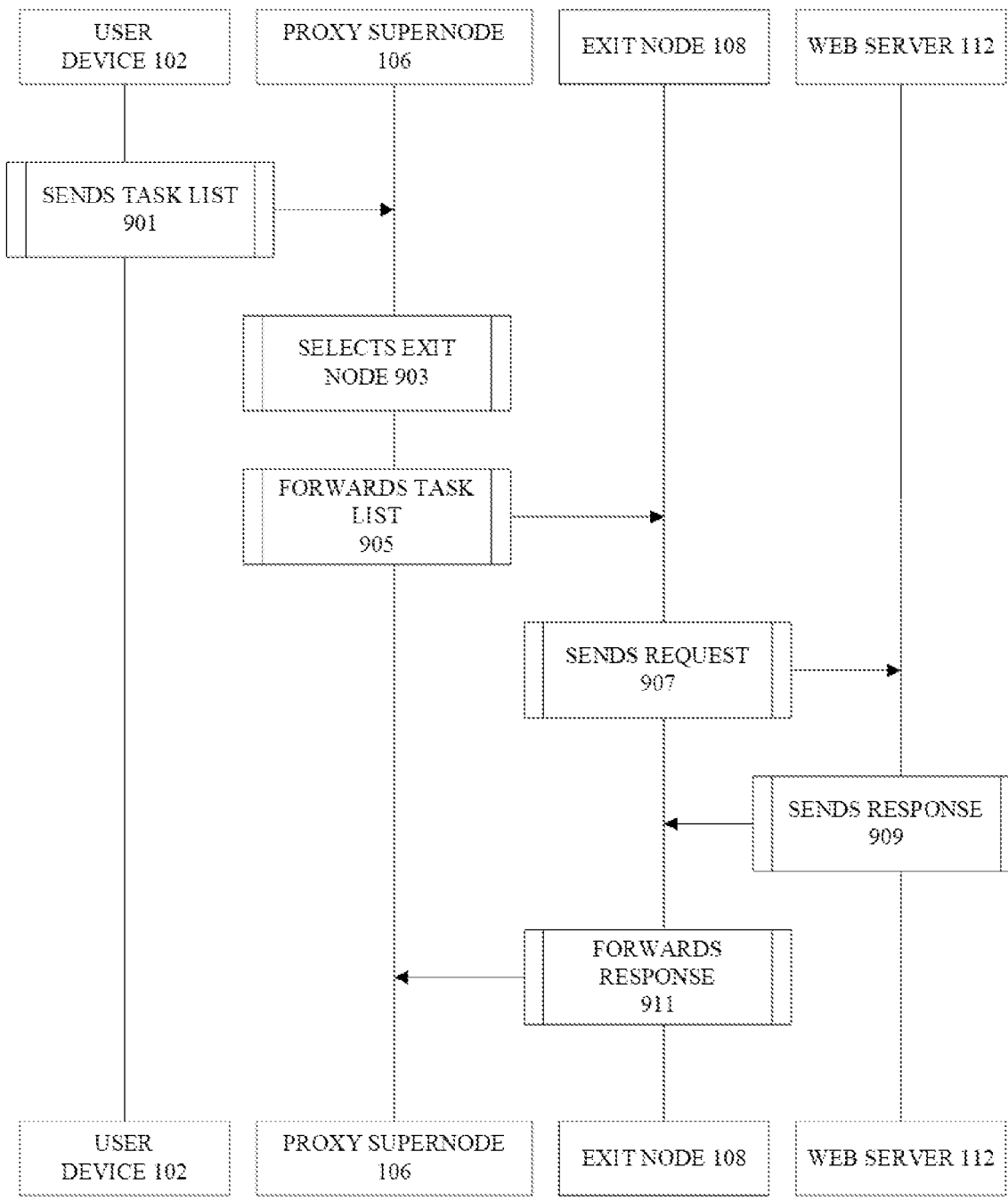
FIG. 9A shows an exemplary flow diagram of synchronization via a task list when a proxy supernode is used over HTTP/3.

FIG. 9A shows an exemplary flow diagram of synchronization via a task list when proxy supernode is used over HTTP/3. In step 901, User Device 102 sends a task list to Proxy Supernode 106 that is intended for the target i.e., Web Server 112. A type of request that is listed on the list can be called a "task list request" but will be referred to as simply "request" for simplicity. The task list from User Device 102 may contain a single or several requests for retrieving data (such as weather, online price changes, product data, etc.) from a single or from multiple targets. The task list may include a list of URLs of the targets, keywords for data search or ranges of web pages for data retrieval. The task list can be sent in from User Device 102 to Web Server 112 through various communication channels, like a text message, email or via an API provided by Web Server 112. However, the particular communication method does not change the overall functionality of the embodiments.

Once a task list is received from User Device 102, in step 903, Proxy Supernode 106 selects a suitable exit node from a plurality of exit nodes managed by it. Exit Node 108 denotes the selected suitable exit node through which the task list is relayed unto Web Server 112. The selection of a suitable exit node is carried out by Proxy Supernode 106 based on several conditions such as the type of target or targets, type of requests present in the task list, specific user-defined criteria in the task list, location proximity and performance history of exit nodes. Proxy Supernode 106 can select a single or multiple exit node based on the analysis of the aforementioned conditions. Proxy Supernode 106 can choose to dedicate the whole list, parts of the list or individual items of the list to single exit nodes or pools of exit nodes. Pools of exit nodes are ordered or unordered sets of exit nodes that are usually rotated for better performance. However, the current embodiments are sufficiently revealed by a case in which a single exit node is assigned a list of tasks.

In step 905, Proxy Supernode 106 forwards a task list or a singular task (which still can be understood as a "task list", although containing one item) to Exit Node 108. Upon receiving the task list from Proxy Supernode 106, Exit Node 108 can run or be continually running a web application that is able to formulate web requests to a target, specified in the task list. Usually, the web application includes an automated script (such as a web browser or web scraper) for automated content retrieval. Scripts are computer programs used to automatically make actions on the part of the web application. In such a way, Exit Node 108 can make web requests without manual input.

In step 907, Exit Node 108 makes an HTTP/3 request unto the target i.e., Web Server 112. Exit Node 108 can make multiple HTTP/3 requests depending upon the nature of the task list unto one or more web servers. Exit Node 108 can make multiple concurrent requests or wait for the requests to be returned in a queue. This will depend on the particular script and web application used but this is not impactful for the current embodiments.

In step 909, Web Server 112 sends back a response for the HTTP/3 request to Exit Node 108. Since HTTP/3 is not a synchronous protocol, Web Server 112 can send multiple messages in response to a single request by Exit Node 108. Exit Node 108 can use the web application with automated scripts to extract required information predefined in the task list. In other cases, Exit Node 108 can also choose to store and return raw web pages, but this is not an optimized use case. Usually, an automated script extracts the required information. The particular choice of data or its format, however, does not change the overall functionality of the embodiments.

In step 911, Exit Node 108 forwards the gathered response back to Proxy Supernode 106. Exit Node 108 can gather the response for multiple tasks and forward back to Proxy Supernode 106 as a collection of responses or can forward the individual response back to Proxy Supernode 106. The execution of the task list can be performed on additional task list items and the task list response can be grouped with responses from the additional task list items in a bulk file of task list responses, and Exit Node 108 can forward the task list responses from the web server in a bulk file to the user device.

Figure 9B:
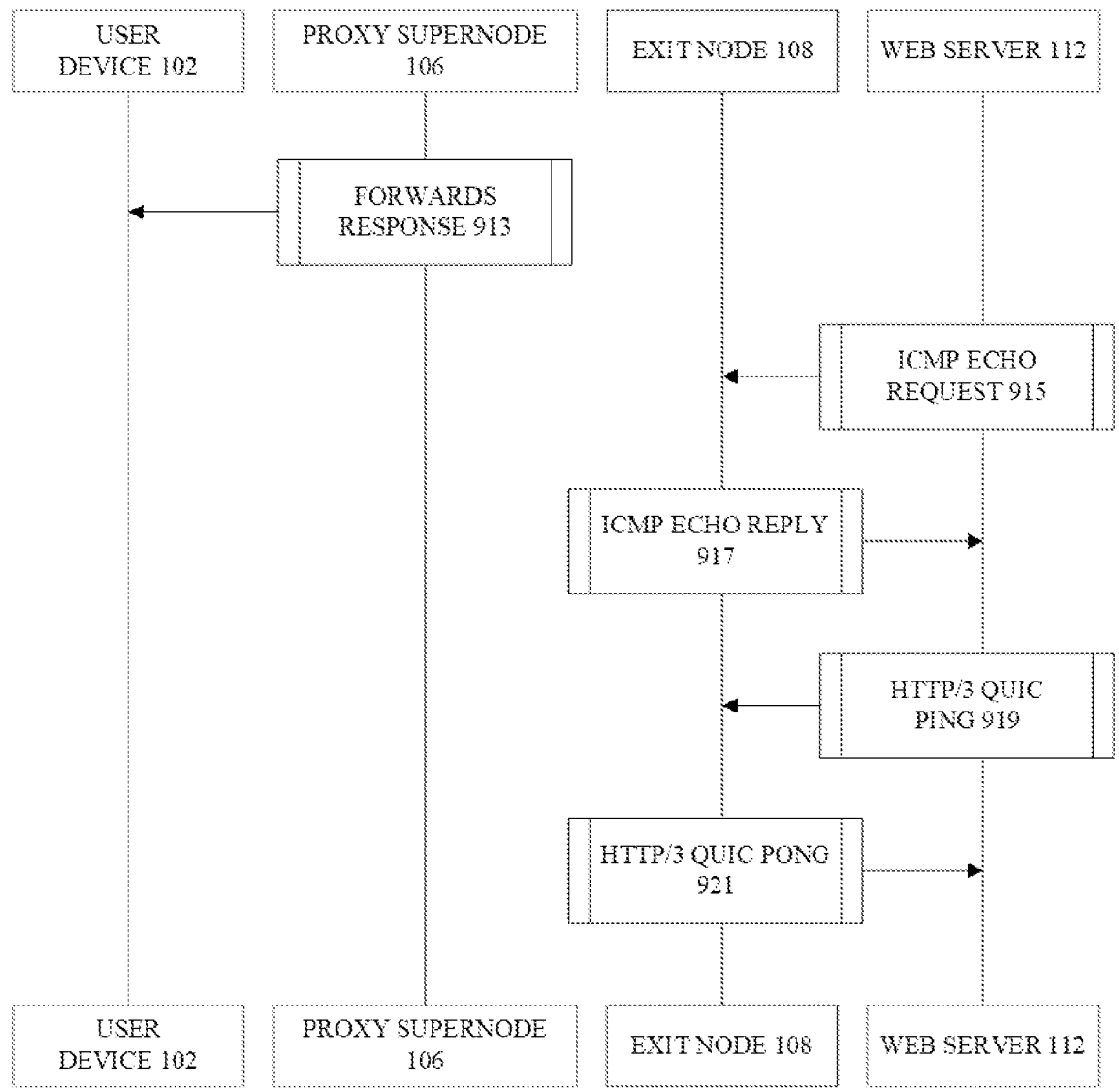
FIG. 9B shows the continuation of the exemplary flow diagram of synchronization via a task list when proxy supernode is used over HTTP/3.

FIG. 9B shows the continuation of the exemplary flow diagram of synchronization via a task list when proxy supernode is used over HTTP/3.

In step 913, Proxy Supernode 106 forwards back the response received from Exit Node 108 to User Device 102. In step 915 Web Server 112 initiates an ICMP ping message to the IP address of Exit Node 108. Since Exit Node 108 has already made an HTTP request to Web Server 112, Web Server 112 will have the visibility into the IP address of Exit Node 108 from which the request was sent. Thus, Web Server 112 can take the IP address of Exit Node 108 and make an ICMP echo request to Exit Node 108.

In step 917, Exit Node 108 receives the ICMP echo request and responds by returning an ICMP echo reply message. An ICMP reply message is required for all hosts and must include the exact payload received in the ICMP echo request. The payload can include a timestamp indicating the time of transmission. This allows Web Server 112 to compute the round-trip time for the ICMP echo message.

In step 919, Web Server 112 initiates an HTTP/3 QUIC ping message to User Device 102. However, since the connection is proxied through Exit Node 108, the HTTP/3 QUIC ping message first reaches Exit Node 108. Different from an HTTP/2 ping frame, the HTTP/3 QUIC ping frame contains a variable-length payload. Empty ping frames are only used to keep a connection alive. But if the data field is not empty, Exit Node 108 must generate a pong frame containing the same data. A pong frame is a reply to a ping frame, similar to an HTTP/2 ping frame with an ACK flag. Thus, using QUIC ping, Web Server 118 can also test an RTT to Exit Node 108 which contains the browser or other application accessing Web Server 118. It is to be mentioned here that HTTP/3 QUIC traffic is encrypted by default.

After receiving the HTTP/3 QUIC ping message, Exit Node 108 is able to decrypt and identify the HTTP/3 QUIC ping frame. In step 921, Exit Node 108, according to the protocol, returns an HTTP/3 QUIC pong frame to Web Server 112. However, in different embodiments, Exit Node 108 can choose to also inform Proxy Supernode 106 about the usage of HTTP/3 QUIC frames but in the current exemplary embodiment, Exit Node 108 does not send further information regarding the ping messages to other elements.

Once the HTTP/3 QUIC pong frame reaches Web Server 112, Web Server 112 can calculate the RTT of the ping messages. Because both ICMP and HTTP/3 ping messages were terminated at Exit Node 108, the RTTs of both pings will be virtually identical. However, there can be minimal difference due to the time taken to decrypt and encrypt the HTTP/3 traffic and momentary network perturbations. However, such issues can be compensated by Web Server 112 and will eventually be negligible.

It is also important to note that the exact order of steps taken by Web Server 112 does not change the functionality of the embodiments. For example, Web Server 112 can choose to perform HTTP/3 QUIC pings before responding to any HTTP/3 requests from Exit Node 108. Web Server 112 can also choose to respond to several requests before performing pings or their comparisons or it can aggregate several ping RTTs and perform an aggregated statistical analysis, thus repeating steps 915-921 several times. However, this does not change the functionality of the embodiments.

Figure 10A:
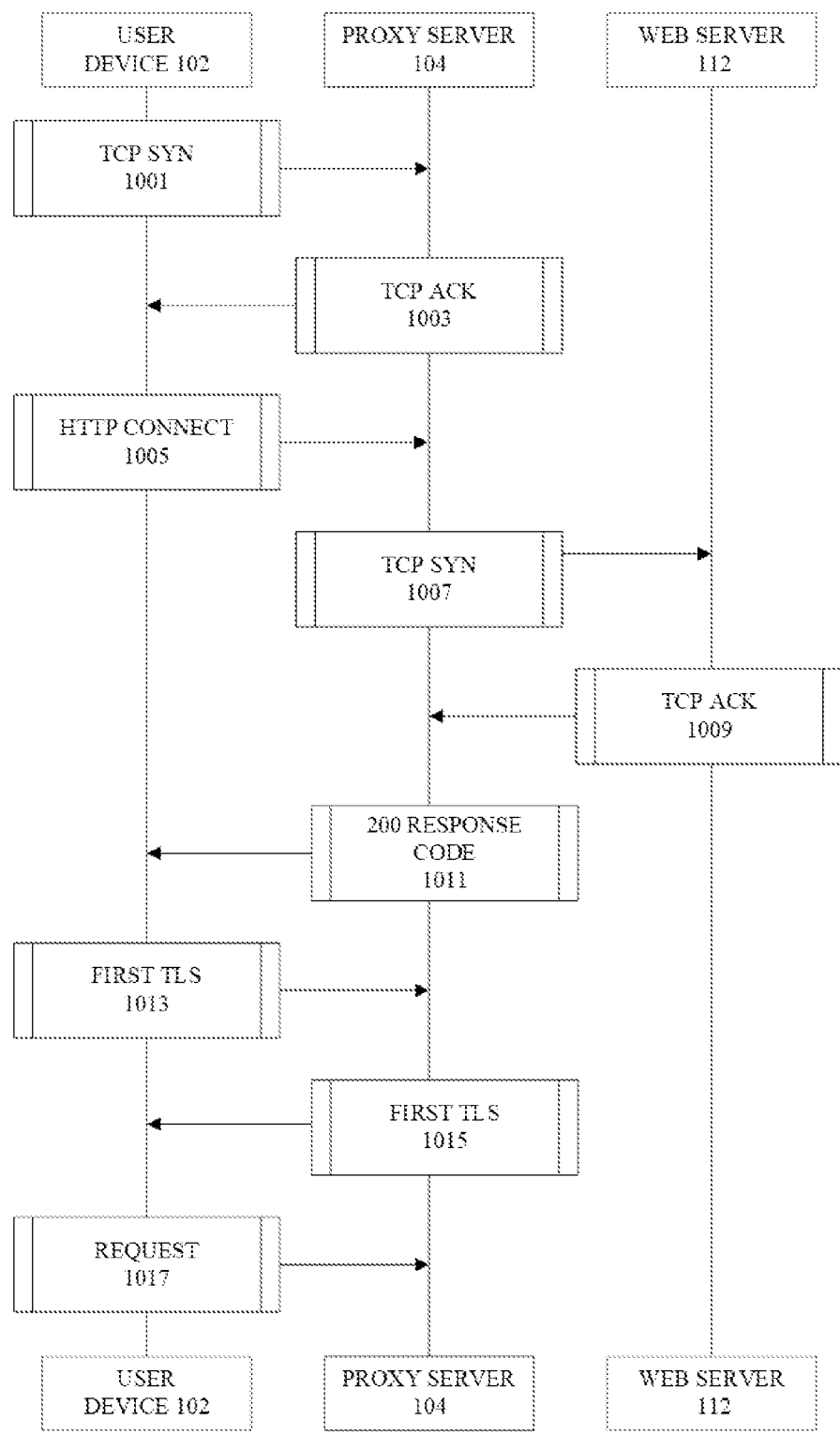
FIG. 10A shows an exemplary flow diagram of intercepted proxy synchronization when proxy server is used over HTTP/2.

FIG. 10A shows an exemplary flow diagram of intercepted proxy synchronization when proxy server is used over HTTP/2. FIG. 10 represents an exemplary flow diagram of intercepted proxy synchronization when proxy server is used over HTTP/2. Some embodiments presented herein do not require to form a proxy chain from User Device 102 to Web Server 112. The network interception can be performed by a single proxy entity, i.e. by Proxy Server 104. In that case Proxy Server 104 performs both as a service provider and as an exit node. In such a use case, Proxy Server 104 is the only individual proxy being employed directly by User Device 102.

In step 1001, User Device 102 initiates a TCP handshake with Proxy Server 104. More precisely, User Device 102 sends a TCP SYN message to an IP address of Proxy Server 104 which is the first step of the TCP handshake.

In step 1003, Proxy Server 104 responds to the TCP handshake initiated by User Device 102. More precisely, the response by Proxy Server 104 can be a SYN/ACK message. There can be more messages exchanged as part of the handshake, like an ACK message sent by User Device 102 to Proxy Server 104. However, this does not change the overall functioning of the embodiments. Steps 1001 and 1003 are meant to include all steps necessary to complete a TCP handshake between User Device 102 and Proxy Server 104.

In step 1005, once a TCP connection is established, User Device 102 sends an HTTP connect request to Proxy Server 104. The particular protocol of communication does not change the functioning of the embodiments.

In step 1007, Proxy Server 104 initiates a TCP handshake with Web Server 112. More precisely, Proxy Server 104 sends a TCP SYN message to Web Server 112 which is the first step of the TCP handshake.

In step 1009, Proxy Server 104 responds to the TCP handshake initiated by User Device 102. More precisely, the response by Web Server 112 can be a SYN/ACK message. There can be more messages exchanged as part of the handshake, like an ACK message sent by Proxy Server 104 to Web Server 112. However, this does not change the overall functioning of the embodiments. Steps 1009 and 1011 are meant to include all steps necessary to complete a TCP handshake between Proxy Server 104 and Web Server 112.

In step 1011, Proxy Server 104 returns an HTTP "200" success status response code to User Device 102 which indicates that the HTTP request made in step 1005 has succeeded.

In step 1013, User Device 102 initiates a TLS handshake which is intercepted by Proxy Server 104. Proxy Server 104 dynamically generates a certificate for Web Server 112 and signs it. Proxy Server 104 uses its internal certificate authority (CA) to sign the generated certificate.

In step 1015, Proxy Server 104 completes the TLS handshake with User Device 102 and establishes a secure HTTPS connection with a certificate that is dynamically signed by an internal CA. Steps 1013 and 1015 are meant to include all the necessary steps to complete a TLS handshake between Proxy Server 104 and User Device 102.

In the current embodiments, the TCP handshake and the TLS handshake are distinguished as two processes. However, in other embodiments they can happen at once. In newer TCP implementations, known as TCP Fast Open, data is exchanged safely during TCP's connection handshake and both handshakes can take place alongside each other. In such a case, steps representing the TLS handshake (1013 and 1015) would be incorporated into the steps representing the TCP handshake (1001 and 1003).

In step 1017, once a TLS handshake is complete, User Device 102 makes an HTTP request for content contained on Web Server 112. The request is proxied via Proxy Server 104 which receives the request.

Figure 10B:
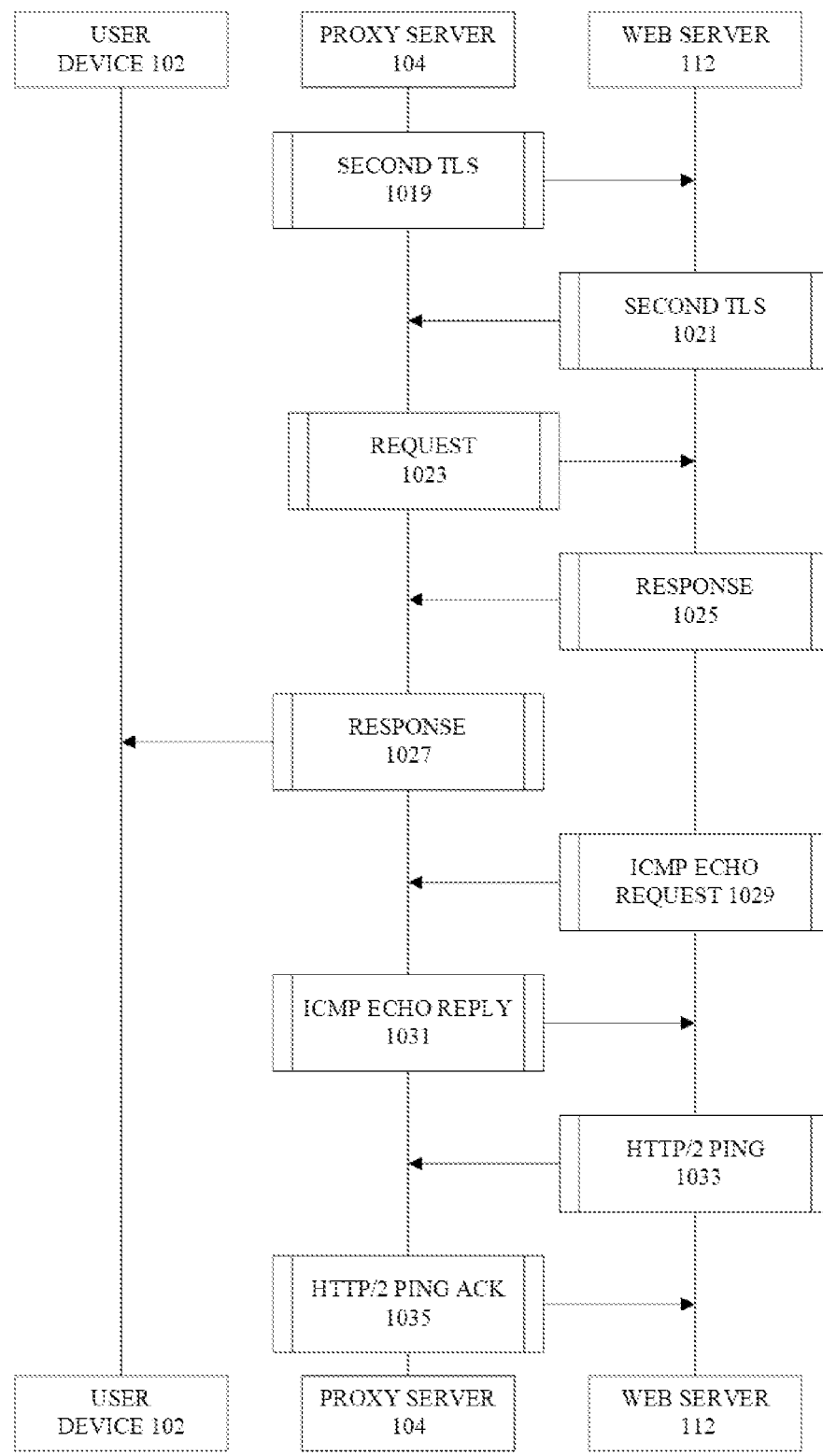
FIG. 10B shows the continuation of the exemplary flow diagram of intercepted proxy synchronization when a proxy server is used over HTTP/2.

FIG. 10B shows the continuation of the exemplary flow diagram of intercepted proxy synchronization when proxy server is used over HTTP/2. In step 1019, Proxy Server 104 initiates a second TLS handshake with Web Server 112. Web Server 112 uses a public certificate signed by a trusted CA.

In step 1021, Web Server 112 completes the second TLS handshake with Proxy Server 104.

In the current embodiments, the TCP handshake and the TLS handshake are distinguished as two processes. However, in other embodiments they can happen at once. In newer TCP implementations, known as TCP Fast Open, data is exchanged safely during TCP's connection handshake and both handshakes can take place alongside each other. In such a case, steps representing the TLS handshake (1019 and 1021) would be incorporated into the steps representing the TCP handshake (1007 and 1009).

In step 1023, Proxy Server 104 makes an HTTP/2 request to Web Server 112 for the content requested in the initial request from User Device 102.

In step 1025, Web Server 112 can return the content requested by Proxy Server 104.

In step 1027, Proxy Server 104 forwards the response from Web Server 112 to User Device 102.

In step 1029, Web Server 112 initiates an ICMP ping message to the IP address of Proxy Server 104. Proxy Server 104 has already made an HTTP request to Web Server 112 and Web Server 112 has the visibility of which IP the request came from. Thus, Web Server 112 can take the IP address of Proxy Server 104 and make an ICMP echo request to it.

In step 1031, Proxy Server 104 receives an ICMP echo request and responds by returning an ICMP echo reply message. An ICMP echo reply message is required for all hosts, and must include the exact payload received in ICMP echo request. The payload can include a timestamp indicating the time of transmission. This allows Web Server 112 to compute the round trip time.

In step 1033, Web Server 112 initiates an HTTP/2 ping message to User Device 102. However, since the connection is proxied, the HTTP/2 ping message reaches Proxy Server 104 first.

In step 1035, Proxy Server 104 receives the HTTP/2 ping message and since the second TLS connection terminates at Proxy Server 104, it is able to decrypt traffic and identify the HTTP/2 ping frame. Once Proxy Server 104 identifies the HTTP/2 ping frame, it is able to send a response. The response required by the protocol is an HTTP/2 ping frame with an ACK flag containing the same payload as the original message. Proxy Server 104 duly responds to the original HTTP/2 ping frame.

Once the HTTP/2 ping frame with an ACK flag reaches Web Server 112, Web Server 112 is able to calculate the RTTs of the ping messages. Because both ICMP and HTTP/2 ping messages were terminated at Proxy Server 104, the RTTs of both pings will be virtually identical. Minimal differences can occur due to time taken to encrypt and decrypt HTTP/2 traffic and momentary network perturbations. However, such issues can be compensated by Web Server 112 and will eventually be negligible.

It is also important to note that the exact order of steps taken by Web Server 112 does not change the functionality of the embodiments. For example, Web Server 112 can choose to perform pings before responding to any HTTP/2 requests. In that case, steps 1029-1035 will take place immediately after step 1021. Web Server 112 can also choose to respond to several requests before performing pings or their comparisons or it can aggregate several ping RTTs and perform an aggregated statistical analysis, thus repeating steps 1029-1035 several times. However, this does not change the functionality of the embodiments.

Figure 11A:
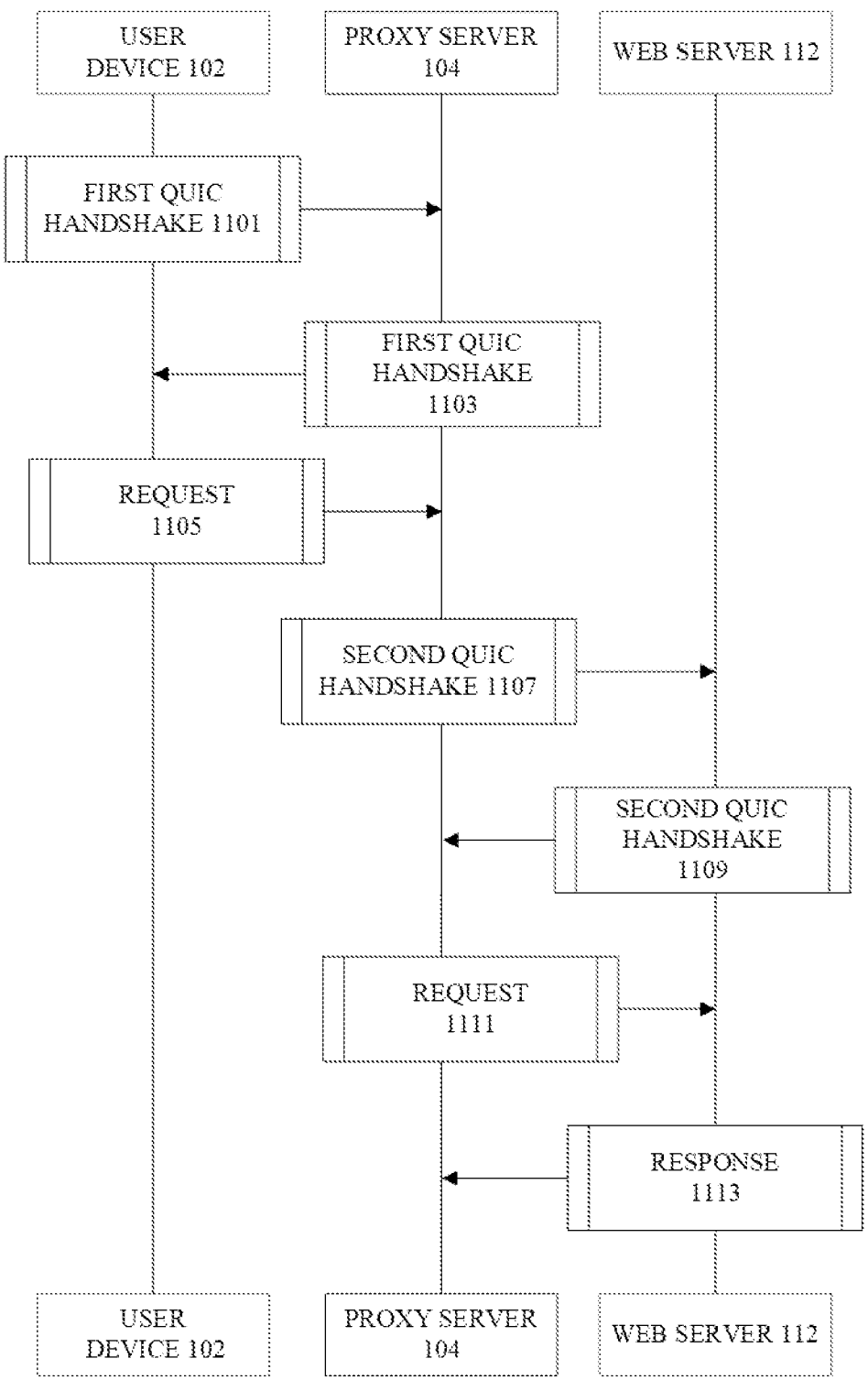
FIG. 11A shows an exemplary flow diagram of intercepted proxy synchronization when a proxy server is used over HTTP/3.

FIG. 11A shows an exemplary flow diagram of intercepted proxy synchronization when proxy server is used over HTTP/3. In step 1101, User Device 102 initiates a first QUIC handshake with Proxy Server 104. QUIC handshake includes a TLS handshake, which provides authentication of the end-points as well as negotiation of cryptographic parameters.

In step 1103, Proxy Server 104 responds and completes the QUIC handshake with User Device 102. A particular handshake flow will depend on the parameters of both endpoints, however, one approach includes a 0-RTT cryptographic handshake. However, User Device 102 and Proxy Server 104 can use a different handshake flow, for example a 1-RTT cryptographic handshake. This does not change the overall functionality of the embodiments. Steps 701 and 703 are meant to include all necessary steps to complete a QUIC handshake.

Proxy Server 104 dynamically generates a certificate for Web Server 112 and signs it. Proxy Server 104 uses its internal certificate authority (CA) to sign the generated certificate. Depending on the application used by User Device 102, it may get a warning message that a certificate is not signed by a trusted CA, however, this does not change the functionality of the embodiments. For all intents and purposes, the present embodiments should be transparent about using dynamically generated certificates to User Device 102.

In step 1105, once a QUIC handshake is complete, User Device 102 makes an HTTP/3 request for the content contained on Web Server 112. The request is proxied via Proxy Server 104 which receives the request.

In step 1107, Proxy Server 104 initiates a second QUIC handshake with Web Server 112. QUIC handshake includes a TLS handshake, which provides authentication of the end-points as well as negotiation of cryptographic parameters.

In step 1109, Web Server 112 responds and completes the QUIC handshake with Proxy Server 104. A particular handshake flow will depend on the parameters of both endpoints, however, one approach includes a 0-RTT cryptographic handshake.

However, Proxy Server 104 and Web Server 112 can use a different handshake flow, for example a 1-RTT cryptographic handshake. This does not change the overall functionality of the embodiments. Steps 1107 and 1109 are meant to include all necessary steps to complete a QUIC handshake.

In step 1111, Proxy Server 104 makes an HTTP/3 request to Web Server 112 for the content requested in the initial request from User Device 102.

In step 1113, Web Server 112 can return the content requested by Proxy Server 104.

Figure 11B:
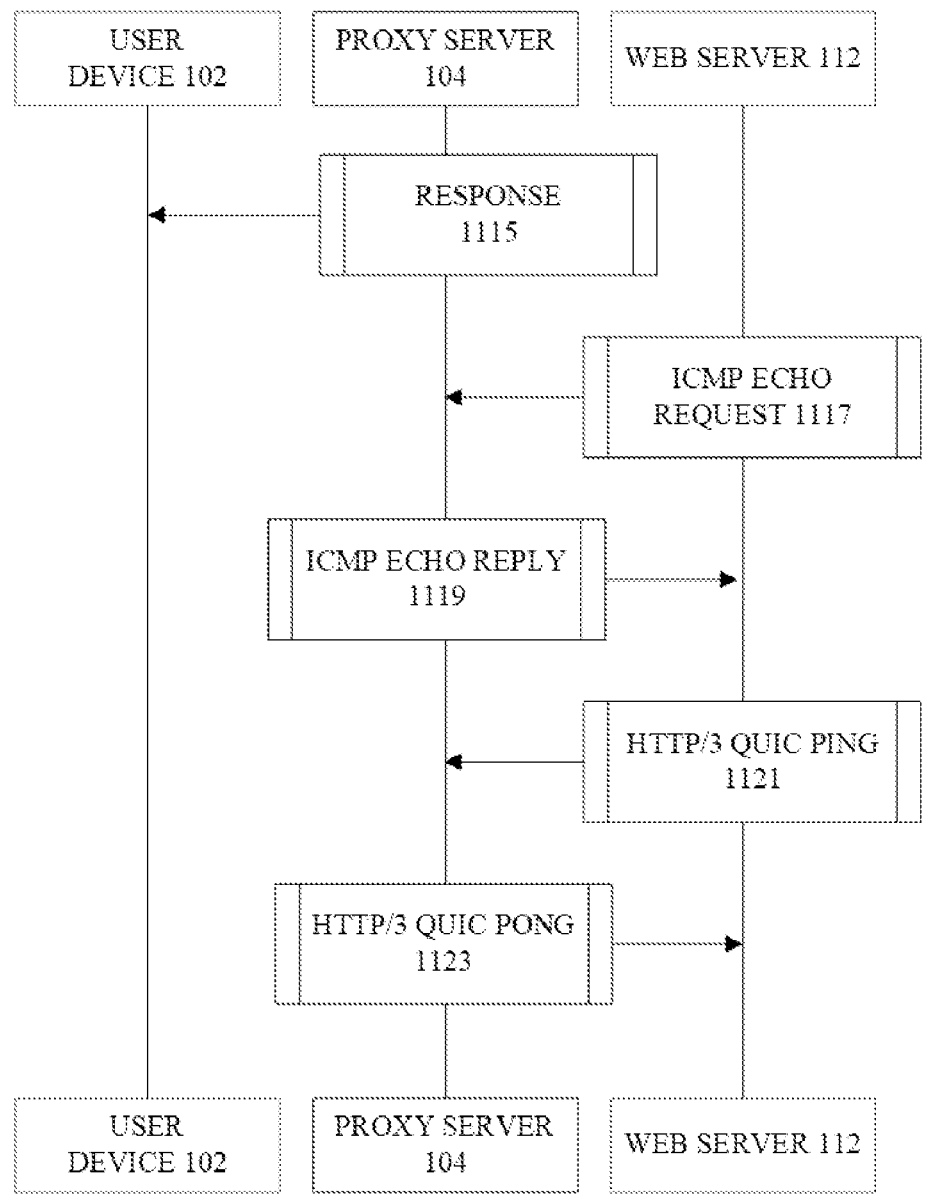
FIG. 11B shows the continuation of the exemplary flow diagram of intercepted proxy synchronization when a proxy server is used over HTTP/3.

FIG. 11B shows the continuation of the exemplary flow diagram of intercepted proxy synchronization when proxy server is used over HTTP/3. In step 1115, Proxy Server 104 forwards the response from Web Server 112 to User Device 102.

In step 1117, Web Server 112 initiates an ICMP ping message to the IP address of Exit Node 108. Exit Node 108 has already made an HTTP request to Web Server 112 and Web Server 112 has the visibility of which IP the request came from. Thus, Web Server 112 can take the IP address of Exit Node 108 and make an ICMP echo request to it.

In step 1119, Exit Node 108 receives ICMP echo request and responds by returning an ICMP echo reply message. An ICMP echo reply message is required for all hosts and must include the exact payload received in the ICMP echo request. The payload can include a timestamp indicating the time of transmission. This allows Web Server 112 to compute the round trip time.

In step 1121, Web Server 112 initiates an HTTP/3 QUIC ping message to User Device 102. However, since the connection is proxied, the HTTP/3 QUIC ping message reaches Web Server 112 first.

In step 1123, Web Server 112 receives the HTTP/3 QUIC ping message and since the second TLS connection terminates at Web Server 112, it is able to decrypt traffic and identify the HTTP/3 QUIC ping frame. Once Web Server 112 identifies the HTTP/3 QUIC ping frame, it can send a response. The response required by the protocol is an HTTP/3 QUIC pong message containing the same payload as the original message. Web Server 112 duly responds to the original HTTP/3 QUIC ping frame.

Once the HTTP/3 QUIC pong message reaches Web Server 112, Web Server 112 is able to calculate the RTT of the ICMP and HTTP/3 QUIC ping messages. Because both ICMP and HTTP/3 QUIC ping messages were terminated at Exit Node 108, the RTTs of both pings will be virtually identical. Minimal differences can occur due to time taken to encrypt and decrypt HTTP/3 QUIC traffic and momentary network perturbations. However, such issues can be compensated by Web Server 112 and will eventually be negligible.

It is also important to note that the exact order of steps taken by Web Server 112 does not change the functionality of the embodiments. For example, Web Server 112 can choose to perform pings before responding to any HTTP/3 requests. In that case, steps 1117-1123 will take place immediately after step 1111. Web Server 112 can also choose to respond to several requests before performing pings or their comparisons or it can aggregate several ping RTTs and perform an aggregated statistical analysis, thus repeating steps 1117-1123 several times. However, this does not change the functionality of the embodiments.

Figure 12:
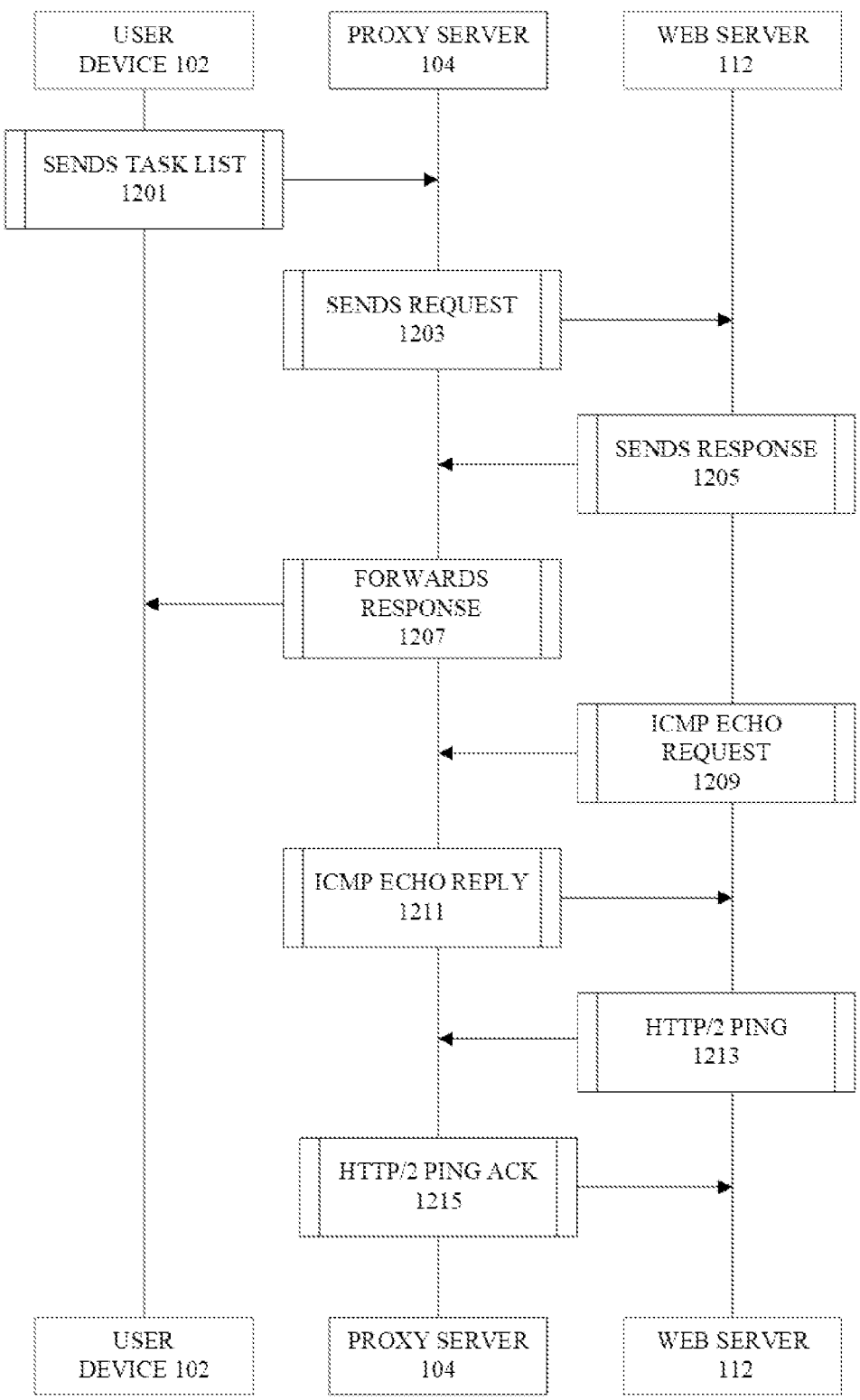
FIG. 12 shows an exemplary flow diagram of synchronization via a task list when a proxy server is used over HTTP/2.

FIG. 12 shows an exemplary flow diagram of synchronization via a task list when a proxy server is used over HTTP/2. In step 1201, User Device 102 sends a task list to Proxy Server 104, that is intended for the target, i.e., Web Server 112. The task list from User Device 102 may contain a single or several requests for retrieving data (such as weather, online price changes, product data, etc.) from a single or multiple targets. The task list may include a list of URLs of the targets, keywords for data search, or ranges of web pages for data retrieval. It must be mentioned here that User Device 102 can send a task list or a singular task (which still can be understood as a "task list", although containing one item) to Proxy Server 104. The task list can be sent in from User Device 102 to Web Server 112 through various communication channels, like a text message, email or via an API provided by Web Server 112. However, the particular communication method does not change the overall functionality of the embodiments.

Upon receiving the task list from User Device 102, Proxy Server 104 can run or be continually running a web application that is able to formulate web requests to a target, specified in the task list. Usually, the web application includes an automated script (such as a web browser or web scraper) for automated content retrieval. Scripts are computer programs used to automatically make actions on the part of the web application.

In step 1203, Proxy Server 104 makes an HTTP/2 request unto the target, i.e., Web Server 112. Proxy Server 108 can make multiple HTTP/2 requests depending upon the nature of the task list unto one or more web servers. Proxy Server 104 can make multiple concurrent requests or wait for the requests to be returned in a queue. This will depend on the particular script and web application used but this is not impactful for the current embodiments In step 1205, Web Server 112 sends back a response for the HTTP/2 request to Proxy Server 104. Since HTTP/2 is not a synchronous protocol, Web Server 112 can send multiple messages in response to a single request by Proxy Server 104. Proxy Server 104 can use the web application with automated scripts to extract required information pre-defined in the task list. In other cases, Proxy Server 104 can also choose to store and return raw web pages, but this is not an optimized use case. Usually, an automated script extracts the required information. The particular choice of data or its format, however, does not change the overall functionality of the embodiments.

In step 1207, Proxy Server 104 forwards the gathered response back to User Device 102. Proxy Server 104 can gather the response for multiple tasks and forward back to User Device 102 as a collection of responses or can forward the individual response back to User Device 102. The execution of the task list can be performed on additional task list items and the task list response can be grouped with responses from the additional task list items in a bulk file of task list responses, and Proxy Server 104 can forward the task list responses from the web server in a bulk file to the user device.

In step 1209 Web Server 112 initiates an ICMP ping message to the IP address of Proxy Server 104. Since Proxy Server 104 has already made an HTTP request to Web Server 112, Web Server 112 will have the visibility to the IP address of Proxy Server 104 from which the request was sent. Thus, Web Server 112 can take the IP address of Proxy Server 104 and make an ICMP echo request.

In step 1211, Proxy Server 104 receives the ICMP echo request and responds by returning an ICMP echo reply message. An ICMP reply message is required for all hosts and must include the exact payload received in the ICMP echo request. The payload can include a timestamp indicating the time of transmission. This allows Web Server 112 to compute the round-trip time for the ICMP echo message.

In step 1213, Web Server 112 initiates an HTTP/2 ping message to User Device 102. However, since the connection is proxied through Proxy Server 104, the HTTP/2 ping message first reaches Proxy Server 104. After receiving the HTTP/2 ping message, Proxy Server 104 is able to decrypt and identify the HTTP/2 ping frame.

Subsequently, in step 1215, Proxy Server 104 is able to send back the response based on the protocol of the HTTP/2 ping frame with ACK flag containing the same payload as the original HTTP/2 ping message.

Once the HTTP/2 ping frame with an ACK flag reaches Web Server 112, Web Server 112 can calculate the RTT of the ping messages. It is noted that since both ICMP and HTTP/2 ping messages were terminated at Proxy Server 104, the RTTs of both pings will be virtually identical. However, there can be minimal difference due to the time taken to decrypt and encrypt the HTTP/2 traffic and momentary network perturbations. However, such issues can be compensated by Web Server 112 and will eventually be negligible.

The exact order of steps taken by Web Server 112 does not change the functionality of the embodiments. For example, Web Server 112 can choose to perform pings before responding to any HTTP/2 requests from Proxy Server 104. Web Server 112 can also choose to respond to several requests before performing pings or their comparisons or it can aggregate several ping RTTs and perform an aggregated statistical analysis, thus repeating steps 1209-1215 several times. However, this does not change the functionality of the embodiments.

Figure 13:
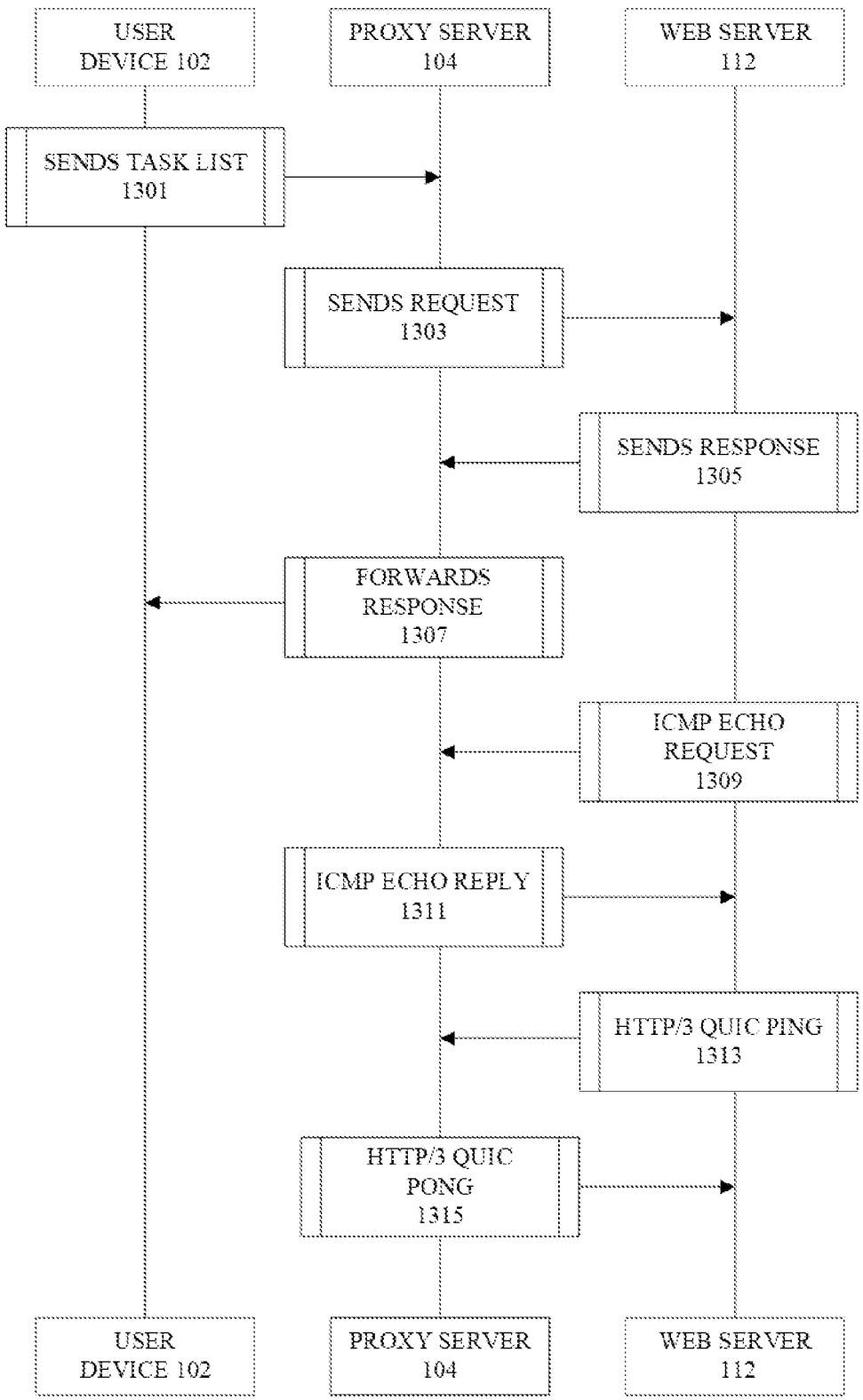
FIG. 13 shows an exemplary flow diagram of synchronization via a task list when a proxy server is used over HTTP/3.

FIG. 13 shows an exemplary flow diagram of synchronization via a task list when a proxy server is used over HTTP/3. In step 1301, User Device 102 sends a task list to Proxy Server 104 is intended for the target, i.e., Web Server 112. The task list from User Device 102 may contain a single or several requests for retrieving data (such as weather, online price changes, product data, etc.) from a single or multiple targets. The task list may include a list of URLs of the targets, keywords for data search or ranges of web pages for data retrieval. User Device 102 can send a task list or a singular task (which still can be understood as a "task list", although containing one item) to Proxy Server 104. The task list can be sent in from User Device 102 to Web Server 112 through various communication channels e.g. a text message, an email, or via an API provided by Web Server 112. However, the particular communication method does not change the overall functionality of the embodiments.

Upon receiving the task list from User Device 102, Proxy Server 104 can run or be continually running a web application that is able to formulate web requests to a target, specified in the task list. Usually, the web application includes an automated script (such as a web browser or web scraper) for automated content retrieval. Scripts are computer programs used to automatically make actions on the part of the web application.

In step 1303, Proxy Server 104 makes an HTTP/3 request unto the target, i.e., Web Server 112. Proxy Server 108 can make multiple HTTP/3 requests depending upon the nature of the task list unto one or more web servers. Proxy Server 104 can make multiple concurrent requests or wait for the requests to be returned in a queue. This will depend on the particular script and web application used but this is not impactful for the current embodiments In step 1305, Web Server 112 sends back a response for the HTTP/2 request to Proxy Server 104. Since HTTP/2 is not a synchronous protocol, Web Server 112 can send multiple messages in response to a single request by Proxy Server 104. Proxy Server 104 can use the web application with automated scripts to extract required information predefined in the task list. In other cases, Proxy Server 104 can also choose to store and return raw web pages, but this is not an optimized use case. Usually, an automated script extracts the required information. The particular choice of data or its format, however, does not change the overall functionality of the embodiments.

In step 1307, Proxy Server 104 forwards the gathered response back to User Device 102. Proxy Server 104 can gather the response for multiple tasks and forward back to User Device 102 as a collection of responses or can forward the individual response back to User Device 102. The execution of the task list can be performed on additional task list items and the task list response can be grouped with responses from the additional task list items in a bulk file of task list responses, and Proxy Server 104 can forward the task list responses from the web server in a bulk file to the user device.

In step 1309. Web Server 112 initiates an ICMP ping message to the IP address of Proxy Server 104. Since Proxy Server 104 has already made an HTTP request to Web Server 112, Web Server 112 will have the visibility to the IP address of Proxy Server 104 from which the request was sent. Thus, Web Server 112 can take the IP address of Proxy Server 104 and make an ICMP echo request.

In step 1311, Proxy Server 104 receives the ICMP echo request and responds by returning an ICMP echo reply message. An ICMP reply message is required for all hosts and must include the exact payload received in the ICMP echo request. The payload can include a timestamp indicating the time of transmission. This allows Web Server 112 to compute the round-trip time for the ICMP echo message.

In step 1313, Web Server 112 initiates an HTTP/3 QUIC ping message to User Device 102. However, since the connection is proxied through Proxy Server 104, the HTTP/3 QUIC ping message first reaches Proxy Server 104. Different from an HTTP/2 ping frame, the HTTP/3 QUIC ping frame contains a variable-length payload. Empty ping frames are only used to keep a connection alive. But if the data field is not empty, Proxy Server 104 must generate a pong frame containing the same data. A pong frame is a reply to a ping frame, similar to a HTTP/2 ping frame with an ACK flag. Thus, using QUIC ping, Web Server 112 can also test RTT to Proxy Server 104 which contains the browser or other application accessing Web Server 118. It is to be mentioned here that HTTP/3 QUIC traffic is encrypted by default.

After receiving the HTTP/3 QUIC ping message, Proxy Server 104 is able to decrypt and identify the HTTP/3 QUIC ping frame. In step 1315, Proxy Server 104, according to the protocol, returns a HTTP/3 QUIC pong frame to Web Server 112.

Once the HTTP/3 QUIC pong frame reaches Web Server 112, Web Server 112 can calculate the RTT of the ping messages. Because both ICMP and HTTP/3 ping messages were terminated at Proxy Server 104, the RTTs of both pings will be virtually identical. However, there can be minimal difference due to the time taken to decrypt and encrypt the HTTP/3 traffic and momentary network perturbations. However, such issues can be compensated by Web Server 112 and will eventually be negligible.

The exact order of steps taken by Web Server 112 does not change the functionality of the embodiments. For example, Web Server 112 can choose to perform HTTP/3 QUIC pings before responding to any HTTP/3 requests from Proxy Server 104. Web Server 112 can also choose to respond to several requests before performing pings or their comparisons or it can aggregate several ping RTTs and perform an aggregated statistical analysis, thus repeating steps 1309-1315 several times. However, this does not change the functionality of the embodiments.

Figure 14:
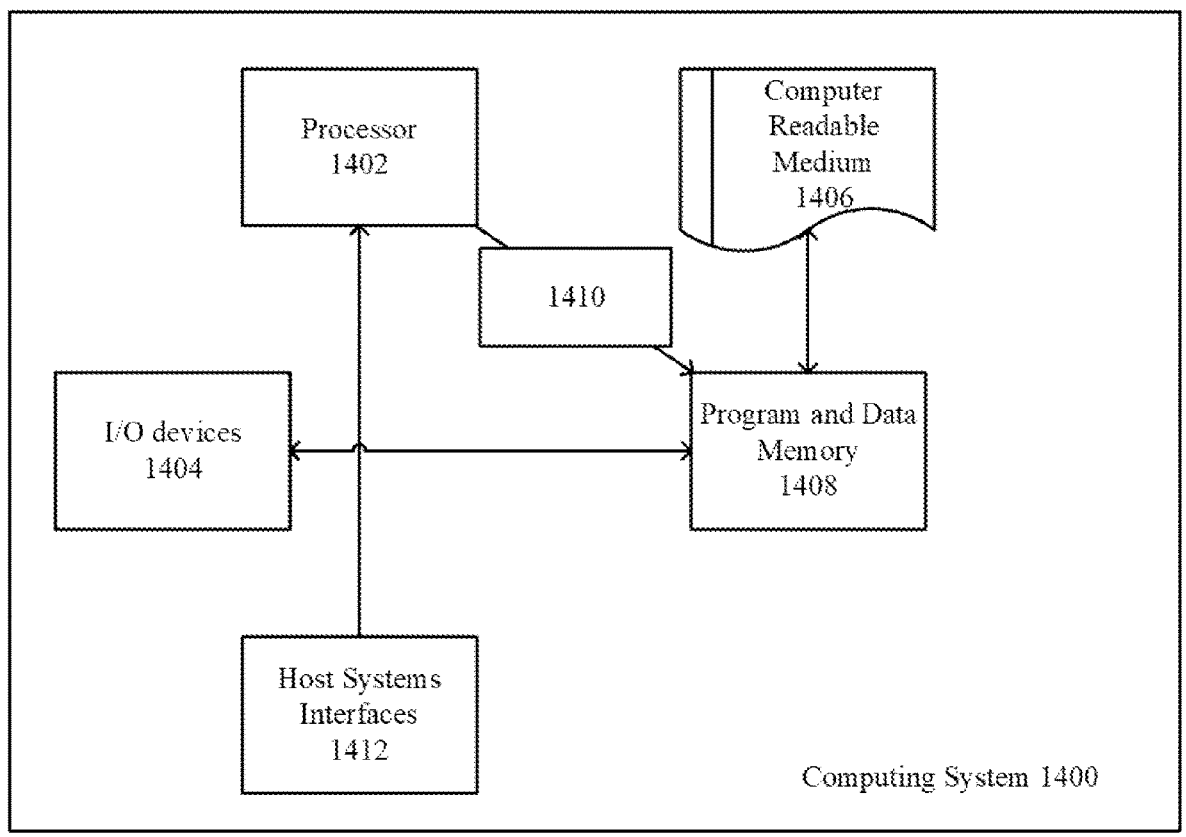
FIG. 14 shows a block diagram of an exemplary computing system.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 14 illustrates a computing system 1200 in which a computer-readable medium 1406 may provide instructions for performing any of the methods and processes disclosed herein.

Furthermore, some aspects of the embodiments herein can take the form of a computer program product accessible from the computer-readable medium 1406 to provide program code for use by or in connection with a computer or any instruction execution system. For the purposes of this description, the computer-readable medium 1406 can be any apparatus that can tangibly store the program code for use by or in connection with the instruction execution system, apparatus, or device, including the computing system 1400.

The computer-readable medium 1406 can be any tangible electronic, magnetic, optical, electromagnetic, infrared, or semiconductor system (or apparatus or device). Some examples of a computer-readable medium 1406 include solid-state memories, magnetic tapes, removable computer diskettes, random access memories (RAM), read-only memories (ROM), magnetic disks, and optical disks. Some examples of optical disks include read-only compact disks (CD-ROM), read/write compact disks (CD-R/W), and digital versatile disks (DVD).

The computing system 1400 can include one or more processors 1402 coupled directly or indirectly to memory 1408 through a system bus 1410. The memory 1408 can include local memory employed during actual execution of the program code, bulk storage, and/or cache memories, which provide temporary storage of at least some of the program code in order to reduce the number of times the code is retrieved from bulk storage during execution.

Input/output (I/O) devices 1404 (including but not limited to keyboards, displays, pointing devices, I/O interfaces, etc.) can be coupled to the computing system 1400 either directly or through intervening I/O controllers. Network adapters may also be coupled to the computing system 1400 to enable the computing system 1400 to couple to other data processing systems, such as through host systems interfaces 1412, printers, and/or or storage devices through intervening private or public networks. Modems, cable modems, and Ethernet cards are just examples of network adapter types.

The disclosure presents a method, a system and a non-transitory computer-readable medium to detect a Proxy server by a Web server comprising: receiving a first message from a User device by the Web server through an HTTP/2 or HTTP/3 QUIC connection; sending by a Web server to a User device an encrypted second message using an HTTP/2 or HTTP/3 QUIC ping; sending, by the Web server to an IP address of the first message, a third message using an ICMP echo request; receiving by the Web Server a fourth message from an IP address of the first message using ICMP echo reply; receiving by a Web Server a fifth message from User Device using HTTP/2 ping with the ACK flag or HTTP/3 QUIC pong; comparing by the Web Server a round trip time (RTT) of second and fifth messages with the RTT of third and fourth messages; deciding by the Web Server a response type to User Device based on the RTT comparison; sending by the Web Server a sixth message containing the response type to User Device through HTTP/2 or HTTP/3 QUIC connection.

In the disclosure a second and third messages can be sent and received independently from each other at any time intervals and in any order.

The round trip time comparison consists of at least one of the following: storing ICMP RTT and HTTP/2 or HTTP/3 RTT; aggregating ICMP RTT and HTTP/2 or HTTP/3 RTT; compensating HTTP/2 RTT or HTTP/3 RTT for encryption time.

In the disclosure storing ICMP RTT and HTTP/2 or HTTP/3 RTT includes timestamps and time lengths of round trip times.

In the disclosure aggregating ICMP RTT and HTTP/2 or HTTP/3 RTT includes at least one of the following: grouping data in categories; forming ordered, partially ordered or unordered series of data; performing statistical analysis; running machine learning and deep learning algorithms; forming predictive models.

In the disclosure after performing the analysis, the Web Server can decide to send the following response types based on ICMP RTT and HTTP/2 or HTTP/3 RTT: Okay response; Error response; Ban response. Okay response means returning the requested content. Error response includes at least one of the following: returning an HTTP error message; dropping the connection; requesting to solve a CAPTCHA. Ban response type means blacklisting an IP address at a Web Server firewall or continually sending HTTP error responses. Banning a user can take an indefinite or definite amount of time.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural form can be used, but it does not limit the scope of the disclosure and the same teaching can apply to multiple objects, even if in the current application an object is referred to in its singular form.

It will be appreciated that some embodiments describe the use of one or more generic or specialized databases (such as "Exit Nodes Database", or similar), that contains a collection of information that is organized so that it can be easily accessed, managed and updated. Computer databases typically contain aggregations of data records or files, in the current case, databases usually store different information and statistics about the proxies or exit nodes, information about utilization threshold of the exit node provider. Such databases can also contain information about the users, requests performed, networks used, exit nodes used, types of exit nodes requested and similar data. Databases are structured to facilitate the storage, retrieval, modification, and deletion of data in conjunction with various data-processing operations.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment.

The invention claimed is:

1. A method to synchronize proxy server ping round trip times by a proxy server comprising:
    receiving by the proxy server a first encrypted connection from a user device over HTTP/2 or HTTP/3;
    dynamically generating and signing by a proxy supernode a certificate for the first encrypted connection;
    wherein the proxy supernode uses an internal certificate authority (CA) to generate and sign the certificate;
    completing, by the proxy supernode, a Transport Layer Security (TLS) handshake with the user device using the certificate;
    establishing a second encrypted connection by the proxy server to a web server over HTTP/2 or HTTP/3 using the certificate;
    receiving by the proxy supernode from the user device an HTTP request for the content contained on a web server;
    forwarding by the proxy supernode the HTTP request to an exit node;
    wherein the web server uses a public certificate signed by a trusted CA to complete the second TLS handshake with the exit node; and
    wherein the web server completes the second TLS handshake with the exit node;
    receiving by the proxy server from the web server an Internet Control Message Protocol (ICMP) echo request;
    sending by the proxy server to the web server an ICMP echo response;
    receiving by the proxy server from the web server an HTTP/2 or HTTP/3 QUIC ping frame over the second encrypted connection;
    decrypting the HTTP/2 or HTTP/3 QUIC ping frame by the proxy server; and,
    sending by the proxy server to the web server an HTTP/2 ping frame with an ACK flag or HTTP/3 QUIC pong frame over the second encrypted connection.

2. The method of claim 1, wherein the receiving by the proxy server a first encrypted connection from a user device over HTTP/2 or HTTP/3 includes accepting the connection by the proxy server.

3. The method of claim 1, wherein functionality of the proxy server is incorporated into an infrastructure of a proxy service provider with an exit node, and wherein:
    the proxy service provider receives the first encrypted connection from the user device over HTTP/2 or HTTP/3;
    the proxy service provider dynamically generates the certificate for the first encrypted connection;
    the proxy service provider establishes a third connection to the exit node;
    the exit node establishes the second encrypted connection to the web server over HTTP/2 or HTTP/3;
    the exit node receives from the web server the ICMP echo request;
    the exit node sends to the web server the ICMP echo response;
    the exit node receives from the web server an HTTP/2 or HTTP/3 QUIC ping frame over the second encrypted connection;
    the exit node decrypts the HTTP/2 or HTTP/3 QUIC ping frame; and,
    the exit node sends to the web server an HTTP/2 ping frame with an ACK flag or HTTP/3 QUIC pong frame over the second encrypted connection.

4. The method of claim 1, wherein the ICMP echo request and the HTTP/2 or HTTP/3 QUIC ping frame is received by the exit node independently from each other in any order and at any time interval.

5. The method of claim 1, wherein a task list is received from the user device over the first encrypted connection; and
wherein the task list contains a single request or several requests for retrieving data from a single or multiple targets.

6. The method of claim 5, wherein execution of the task list comprises:
making a task list request by the proxy server to the web server indicated in the task list over the second encrypted connection;
receiving a task list response by the proxy server from the web server over the second encrypted connection;
forwarding the task list response by the proxy server to the user device over the first encrypted connection;
receiving by the proxy server from the web server the ICMP echo request;
sending by the proxy server to the web server the ICMP echo response;
receiving by the proxy server from the web server the HTTP/2 or HTTP/3 QUIC ping frame over the second encrypted connection;
decrypting the HTTP/2 or HTTP/3 QUIC ping frame by the proxy server; and, sending by the proxy server to the web server the HTTP/2 ping frame with the ACK flag or HTTP/3 QUIC pong frame over the second encrypted connection.

7. The method of claim 6, wherein the ICMP echo request and the HTTP/2 or HTTP/3 QUIC ping frame is received before the task list response by the proxy server from the web server is received.

8. The method of claim 6, wherein the proxy server makes more than one task list request to the web server before forwarding the task list response to the user device.

9. The method of claim 8, wherein a number of task list requests made by the proxy server includes a part of the list or an entirety of the list.

10. The method of claim 6, wherein the proxy server waits for a callback request from the user device before returning the task list response.

11. The method of claim 6, wherein the proxy server extracts or aggregates data received from the web server before forwarding the task list response to the user device.

12. The method of claim 6, wherein the execution of the task list is performed on additional task list items and the task list response is grouped with responses from the additional task list items in a bulk file of task list responses, and wherein the proxy server forwards the task list responses from the web server in the bulk file to the user device.

13. The method of claim 5, wherein the functionality of the proxy server is incorporated into a broader infrastructure of a proxy service provider with an exit node, wherein:
the proxy service provider forwards the task list to the exit node;
the exit node makes a task list request to a web server indicated in the task list over the second encrypted connection;
the exit node receives a task list response from the web server over the second encrypted connection;
the exit node forwards the task list response to the proxy service provider over a third connection;
the proxy service provider forwards the task list response to the user device over the first encrypted connection;
the exit node receives from the web server the ICMP echo request;
the exit node sends to the web server the ICMP echo response;
the exit node receives from the web server an HTTP/2 or HTTP/3 QUIC ping frame over the second encrypted connection;
the exit node decrypts the HTTP/2 or HTTP/3 QUIC ping frame; and,
the exit node sends to the web server the HTTP/2 ping frame with an ACK flag or HTTP/3 QUIC pong frame over the second encrypted connection.

14. The method of claim 1, further comprising repeating said:
receiving by the proxy server from the web server the ICMP echo request;
sending by the proxy server to the web server the ICMP echo response;
receiving by the proxy server from the web server the HTTP/2 or HTTP/3 QUIC ping frame over the second encrypted connection;
decrypting the HTTP/2 or HTTP/3 QUIC ping frame by the proxy server; and,
sending by the proxy server to the web server the HTTP/2 ping frame with the ACK flag or HTTP/3 QUIC pong frame over the second encrypted connection;
to compute a Round Trip Time that synchronizes the proxy server with the web server such that the web server evaluates whether the proxy server includes the ICMP echo response.

15. The method of claim 1, wherein the second TLS handshake and the TLS handshake happen at a same time.

16. A system of synchronizing proxy server ping round trip times comprising:
at least a proxy server operable to perform at least the following actions:
receive, by the proxy server, a first encrypted connection from a user device over HTTP/2 or HTTP/3;
dynamically generate and sign, by a proxy supernode, a certificate for the first encrypted connection, wherein the proxy supernode uses an internal certificate authority (CA) to generate and sign the certificate;
complete, by the proxy supernode, a Transport Layer Security (TLS) handshake with the user device using the certificate;
establish a second encrypted connection by the proxy server to a web server over HTTP/2 or HTTP/3 using the certificate;
receive, by the proxy supernode, from the user device an HTTP request for the content contained on a web server;
forward, by the proxy supernode, the HTTP request to an exit node;
wherein the web server uses a public certificate signed by a trusted CA to complete a second TLS handshake with the exit node; and
wherein the web server completes the second TLS handshake with the exit node;
receive, by the proxy server, from the web server an Internet Control Message Protocol (ICMP) echo request;
send, by the proxy server, to the web server an ICMP echo response;
receive, by the proxy server, from the web server an HTTP/2 or HTTP/3 QUIC ping frame over the second encrypted connection;
decrypt the HTTP/2 or HTTP/3 QUIC ping frame by the proxy server; and, send, by the proxy server, to the web server an HTTP/2 ping frame with an ACK flag or HTTP/3 QUIC pong frame over the second encrypted connection.

17. The system of claim 16, wherein the proxy server can be comprised of a proxy service provider with an exit node, and wherein:
    the proxy service provider receives the first encrypted connection from the user device over HTTP/2 or HTTP/3;
    the proxy service provider dynamically generates the certificate for the first encrypted connection;
    the proxy service provider establishes a third connection to the exit node;
    the exit node establishes the second encrypted connection to the web server over HTTP/2 or HTTP/3;
    the exit node receives from the web server the ICMP echo request;
    the exit node sends to the web server the ICMP echo response;
    the exit node receives from the web server an HTTP/2 or HTTP/3 QUIC ping frame over the second encrypted connection;
    the exit node decrypts the HTTP/2 or HTTP/3 QUIC ping frame; and,
    the exit node sends to the web server an HTTP/2 ping frame with an ACK flag or HTTP/3 QUIC pong frame over the second encrypted connection.

18. The system of claim 16, wherein the proxy server can be comprised of a proxy service provider with an exit node, wherein:
    the proxy service provider forwards a task list to the exit node;
    the exit node makes a task list request to a web server indicated in the task list over the second encrypted connection;
    the exit node receives a task list response from the web server over the second encrypted connection;
    the exit node forwards the task list response to the proxy service provider over a third connection;
    the proxy service provider forwards the task list response to the user device over the first encrypted connection;
    the exit node receives from the web server the ICMP echo request;
    the exit node sends to the web server the ICMP echo response;
    the exit node receives from the web server an HTTP/2 or HTTP/3 QUIC ping frame over the second encrypted connection;
    the exit node decrypts the HTTP/2 or HTTP/3 QUIC ping frame; and,
    the exit node sends to the web server the HTTP/2 ping frame with an ACK flag or HTTP/3 QUIC pong frame over the second encrypted connection.

19. The system of claim 18, wherein the ICMP echo request and the HTTP/2 or HTTP/3 QUIC ping frame is received by the exit node independently from each other in any order and at any time interval.

20. The system of claim 18, wherein the proxy server receives the task list over the first encrypted connection.

21. The system of claim 18, wherein execution of the task list comprises:
    making the task list request by the proxy server to the web server indicated in the task list over the second encrypted connection;
    receiving the task list response by the proxy server from the web server over the second encrypted connection;
    forwarding the task list response by the proxy server to the user device over the first encrypted connection;
    receiving by the proxy server from the web server the ICMP echo request;
    sending by the proxy server to the web server the ICMP echo response;
    receiving by the proxy server from the web server the HTTP/2 or HTTP/3 QUIC ping frame over the second encrypted connection;
    decrypting the HTTP/2 or HTTP/3 QUIC ping frame by the proxy server; and,
    sending by the proxy server to the web server the HTTP/2 ping frame with the ACK flag or HTTP/3 QUIC pong frame over the second encrypted connection.

22. The system of claim 18, wherein the proxy server makes more than one task list request to the web server before forwarding the task list response to the user device.

23. The system of claim 16, further comprising repeating said:
    receiving by the proxy server from the web server the ICMP echo request;
    sending by the proxy server to the web server the ICMP echo response;
    receiving by the proxy server from the web server the HTTP/2 or HTTP/3 QUIC ping frame over the second encrypted connection;
    decrypting the HTTP/2 or HTTP/3 QUIC ping frame by the proxy server; and,
    sending by the proxy server to the web server the HTTP/2 ping frame with the ACK flag or HTTP/3 QUIC pong frame over the second encrypted connection;
    to compute a Round Trip Time that synchronizes the proxy server with the web server such that the web server evaluates whether the proxy server includes the ICMP echo response.

* * * * *